United States Patent
Hayashida

(10) Patent No.: US 9,491,507 B2
(45) Date of Patent: Nov. 8, 2016

(54) CONTENT PROVIDING PROGRAM, CONTENT PROVIDING METHOD, AND CONTENT PROVIDING APPARATUS

(71) Applicant: FUJITSU LIMITED, Kawasaki-shi, Kanagawa (JP)

(72) Inventor: Naoko Hayashida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/286,217

(22) Filed: May 23, 2014

(65) Prior Publication Data

US 2014/0351836 A1 Nov. 27, 2014

(30) Foreign Application Priority Data

May 24, 2013 (JP) .................................. 2013-110023

(51) Int. Cl.
| | |
|---|---|
| H04N 7/16 | (2011.01) |
| H04N 21/442 | (2011.01) |
| H04N 21/488 | (2011.01) |
| H04N 21/25 | (2011.01) |
| H04N 21/2668 | (2011.01) |
| H04N 21/845 | (2011.01) |
| H04N 21/4223 | (2011.01) |

(52) U.S. Cl.
CPC ...... *H04N 21/44218* (2013.01); *H04N 21/252* (2013.01); *H04N 21/2668* (2013.01); *H04N 21/488* (2013.01); *H04N 21/845* (2013.01); *H04N 21/4223* (2013.01)

(58) Field of Classification Search
None
See application file for complete search history.

(56) References Cited

U.S. PATENT DOCUMENTS

| | | | |
|---|---|---|---|
| 2004/0261096 A1* | 12/2004 | Matz | 725/28 |
| 2005/0281531 A1* | 12/2005 | Unmehopa | 386/46 |
| 2007/0126854 A1* | 6/2007 | Moreau et al. | 348/14.01 |
| 2013/0152113 A1* | 6/2013 | Conrad | H04N 21/42201 725/12 |
| 2013/0232515 A1* | 9/2013 | Rivera | H04N 21/44213 725/12 |
| 2014/0023338 A1* | 1/2014 | Won et al. | 386/230 |
| 2014/0078039 A1* | 3/2014 | Woods et al. | 345/156 |
| 2014/0150002 A1* | 5/2014 | Hough et al. | 725/9 |
| 2015/0040166 A1* | 2/2015 | Tamura et al. | 725/80 |
| 2015/0135203 A1* | 5/2015 | Tsurumi | 725/12 |

FOREIGN PATENT DOCUMENTS

| | | |
|---|---|---|
| JP | 2003-178078 | 6/2003 |
| JP | 2005-056205 | 3/2005 |
| JP | 2005-346471 | 12/2005 |
| JP | 2006-041581 | 2/2006 |
| JP | 2007-082022 | 3/2007 |

* cited by examiner

Primary Examiner — Fernando Alcon
(74) Attorney, Agent, or Firm — Fujitsu Patent Center

(57) ABSTRACT

A content providing program causing a computer to execute content provision processing including, acquiring a first viewing situation of a first viewer viewing a provided content in association with time when the content is provided; registering, on the basis of the first viewing situation, as feedback desirable content, missed content in a time segment in which the first viewer is likely to have failed to view the content; estimating, on the basis of the first viewing situation of the first viewer, a state in which the first viewer is enabled to view the content; and providing the first viewer with the feedback desirable content in a time segment in which estimation is made that the first viewer is in a viewable state.

9 Claims, 24 Drawing Sheets

FIG. 9
(1) CONTENT IMPORTANCE DATA OF CONTENT C1 OF VIEWER A
| tsI | 1 | 2 | 3 | ...... | 10 | 11 | 12 | 13 | 14 | ...... | N |
|---|---|---|---|---|---|---|---|---|---|---|---|
| IMPORANCE | L | L | H | H | H | M | L | M | H | | L |
(2) CONTENT IMPORTANCE
H
M
L
(3) VIEWING SITUATION OF CONTENT C1 OF VIEWER D
VIEWING RECEPTIVE LEVEL
H
L
(4) FEEDBACK PART DISTINGUISHING DATA OF CONTENT C1 OF VIEWER D
| tsI | 1 | 2 | 3 | ...... | 10 | 11 | 12 | 13 | 14 | ...... | N |
|---|---|---|---|---|---|---|---|---|---|---|---|
| FB NECESSARY FLAG | false | false | true | true | true | false | false | false | false | | false |
FB TARGET CONTENT FIG. 11
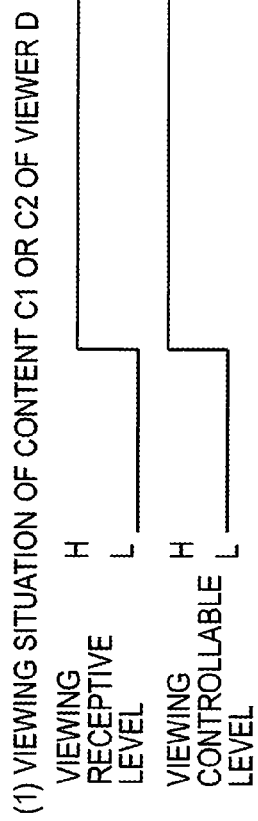
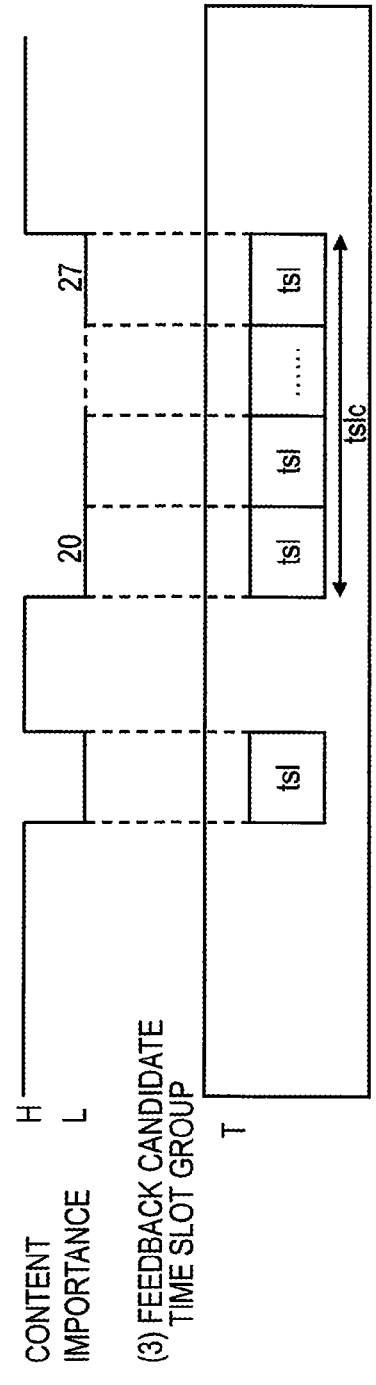
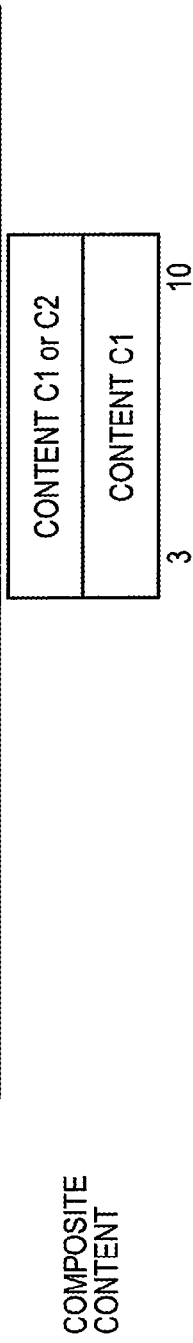

FIG. 15

| (ACCUMULATED DATA) ATTENTIVE AUDIENCE SENSING DATA |

VISUAL ATTENTION AREA DATA

| | TIME | USER | SCREEN | USER ACTUAL VISUAL ATTENTION ESTIMATION MAP |
|---|---|---|---|---|
| t0 | 2012/7/12 11:00:01.030 | userA | scrB | /tmp/map.userA_20120712110000001030 |
| t1 | 2012/7/12 11:00:01.069 | userA | scrB | /tmp/map.userA_20120712110000001069 |
| | : | : | : | : |

EVENT RECOGNITION DATA

| TIME | USER | SCREEN | EVENT RECOGNITION RESULT |
|---|---|---|---|
| 2012/7/12 11:00:02.040 | userA | scrB | Start: Facing to other people |
| 2012/7/12 11:00:03.069 | userA | scrB | Start: Away their seat |
| : | : | : | |

PROPERTY DATA

| TIME | USER | SCREEN | PROPERTY AFTER CHANGE |
|---|---|---|---|
| 2012/7/12 11:0003.070 | userA | scrB | ScreanSaverOFF:False |
| 2012/7/12 11:00:03.072 | userA | scrB | |
| : | : | | |

FIG. 16

(ACCUMULATED DATA) WINDOW, DISPLAYED CONTENT HISTORY

WINDOW COORDINATE

| | TIME | USER | SCREEN | WINDOW ID | UPPER -LEFT X COORDI -NATE | UPPER -LEFT Y COORDI -NATE | WIDTH | HEIGHT | OVER -LAYING ORDER |
|---|---|---|---|---|---|---|---|---|---|
| t0 | 2012/7/12 11:00:01.030 | userA | scrB | 1, | 10 | 10 | 300 | 300 | 1 |
| t0 | 2012/7/12 11:00:01.030 | userA | scrB | 2 | 100 | 10 | 500 | 500 | 2 |
| t1 | 2012/7/12 11:00:01.069 | userA | scrB | 1 | 10 | 10 | 300 | 1000 | 1 |
| | : | | | | | | | | |

DISPLAYED CONTENT HISTORY

| | TIME | USER | SCREEN | WINDOW ID | CONTENT ID |
|---|---|---|---|---|---|
| t0 | 2012/7/12 11:00:01.030 | userA | scrB | 1 | 1 |
| t0 | 2012/7/12 11:00:01.030 | userA | scrB | 2 | 2 |
| t1 | 2012/7/12 11:00:01.069 | userA | scrB | 1 | 1 |
| | : | | | | |

FIG. 17

(REGISTERED DATA) CONTENT

CONTENT

| CONTENT ID | URI |
|---|---|
| C1 | file://localhost/drive/c/movie1.avi |
| C2 | file://localhost/drive/c/meetingmat.pdf |
| : | |

PROVISION IMPORTANCE

| CONTENT ID | TIME SLOT | PROVISION IMPORTANCE |
|---|---|---|
| C1 | 1 | High |
| C1 | 2 | Low |
| : | : | |

FIG. 20

| (EVALUATION DATA) VIEWING SCORE | | | | | | |
|---|---|---|---|---|---|---|
| TIME (start) | TIME (end) | USER | SCREEN | CONTENT ID | VIEWING FLAG | VIEWING SCORE OF CONTENT |
| 2012/7/12 11:00:01.030 | 2012/7/12 11:00:01.069 | userA | scrB | C1 | VIEWING | 8000 |
| : | | | | | | |

FIG. 21

| (EVALUATION DATA) VIEWING SITUATION | | | | | |
|---|---|---|---|---|---|
| TIME (start) | TIME (end) | USER | SCREEN | VIEWING RECEPTIVELEVEL | VIEWING CONTROLLABLE LEVEL |
| 2012/7/12 11:00:01.030 | 2012/7/12 11:00:01.069 | userA | scrB | Mid | Mid |
| : | | | | | |

FIG. 22

| (REGISTERED DATA) CONTROL DATA OF VIEWING CONTROLLABLE LEVEL | | | |
|---|---|---|---|
| EVENT, PROPERTY FOR INCREMENTING OR DECREMENTING REGISTERED VIEWING CONTROLLABLE LEVEL | CONTROL FLAG | TYPE OF CONTROL | CONTROL VALUE |
| Facing to other people | Absolute Value Change | event | Low |
| Away their seat | Absolute Value Change | event | Low |
| Facing to Screen | Absolute Value Change | event | Mid |
| Back to their seat | Absolute Value Change | event | Mid |
| ScreenON:False | Absolute Value Change | property | Low |
| ScreenSaverOFF:False | Absolute Value Change | property | Low |
| LoginON:True | Absolute Value Change | property | High |
| : | | | |

FIG. 23

(TEMPORARILY-CREATED DATA) CONTENT VIEWING SITUATION LIST

VIEWING SITUATION GOOD:
 (VIEWING RECEPTIVE LEVEL, VIEWING CONTROLLABLE LEVEL) = (High, High)

VIEWING SITUATION GOOD RATIO:
 NUMBER OF VIEWING SITUATION GOOD / TOTAL NUMBER OF VIEWING SITUATION DATA * 100

| CONTENT ID | TIME SLOT | PROVISION IMPORTANCE | VIEWING SITUATION GOOD RATIO (%) | VIEWING IMPORTANCE | CONTENT IMPORTANCE |
|---|---|---|---|---|---|
| C1 | 1 | High | 80 | High | High |
| C1 | 2 | Low | 10 | Low | Low |
| C1 | 3 | Low | 90 | High | High |
| C1 | 4 | High | 50 | Mid | High |
| : | | | | | |

(REGISTERED DATA) IMPORTANCE LABEL DESIGNATION TO BE USED

| USER GROUP | IMPORTANCE LABEL DESIGNATION TO BE USED |
|---|---|
| SALES GROUP 1 | FOR SALES (EVALUATED BY DATA COLLECTED ON JULY 12, 2012) |
| PURCHASE GROUP 1 | |
| : | |

(EVALUATION DATA) CONTENT IMPORTANCE

CONTENT VIEWING SITUATION LIST

| CONTENT ID | TIME SLOT | IMPORTANCE LABEL | IMPORTANCE |
|---|---|---|---|
| C1 | 1 | FOR SALES (EVALUATED BY DATA COLLECTED ON JULY 12, 2012) | High |
| C1 | 2 | FOR SALES (EVALUATED BY DATA COLLECTED ON JULY 12, 2012) | Low |
| C1 | 3 | FOR SALES (EVALUATED BY DATA COLLECTED ON JULY 12, 2012) | High |
| C1 | 4 | FOR SALES (EVALUATED BY DATA COLLECTED ON JULY 12, 2012) | High |
| : | : | : | : |

FIG. 24

| (GENERATED DATA) FEEDBACK PART DISTINGUISHING DATA | | | | | |
|---|---|---|---|---|---|
| CREATED TIME STAMP | USER | SCREEN | CONTENT ID | TIME SLOT | FEEDBACK NECESSARY |
| 2012/7/16 13:00:00.001 | userD | scrB | C1 | 3 | true |
| 2012/7/16 13:00:01.020 | userD | scrB | C1 | 4 | true |
| 2012/7/16 13:00:02.043 | userD | scrB | C1 | 5 | true |
| : | | | | | |

FIG. 26

| (GENERATED DATA) FEEDBACK RESERVATION | | | | | | | | |
|---|---|---|---|---|---|---|---|---|
| CREATED TIME STAMP | USER | SCREEN | FEED-BACK POINT CONTENT ID | FEED-BACK POINT START TIME SLOT | FEED-BACK POINT END TIME SLOT | COMPOSITE COMPLETED CONTENT ID | RESERVATION START TIME SLOT | RESERVATION END TIME SLOT | FEEDBACK RESERVATION EXECUTION |
| 2012/7/16 13:00:03.024 | userD | scrB | 1 | 3 | 10 | 1 | 20 | 27 | false |
| 2012/7/16 13:01:01.030 | userF | scrA | 1 | 61 | 63 | 1 | 100 | 101 | false |
| 2012/7/16 14:00:02.010 | userG | scrA | 2 | 2 | 20 | 2 | 22 | 25 | false |
| : | | | | | | | | | |

CONTENT PROVIDING PROGRAM, CONTENT PROVIDING METHOD, AND CONTENT PROVIDING APPARATUS

CROSS-REFERENCE TO RELATED APPLICATION

This application is based upon and claims the benefit of priority of the prior Japanese Patent Application No. 2013-110023, filed on May 24, 2013, the entire contents of which are incorporated herein by reference.

FIELD

The present invention relates to a content providing program, a content providing method, and a content providing apparatus.

BACKGROUND

When a speech, a lecture, or the like is addressed to a large audience in a lecture hall or a classroom, conventionally a speaker or lecturer provides the content of a speech, a lecture, or the like, directly to the audience—viewers of the content. In such a case, the speaker or the lecturer is able to flexibly change the content while checking a degree of fatigue of the audience, and the audience is able to listen to the speech, the lecture, or the like seated without effectively being interrupted from the outside during a session of the above.

On the other hand, in recent years, more and more providers and audience of content at remote places enjoy the benefit of, for example, E-learning or on-line video delivery of lecture content. In this case, since the provider and the audience of the content are at different places, the content provider may be unable to recognize states of the audience. More specifically, it is difficult for the content provider, for example, to flexibly adjust the content through checking whether the audience is surely receiving the content, i.e., through checking, for example, whether there is an individual who dozes and fails to obtain an important point or whether the lecture is audible to even the audience in the back of a lecture room.

On the audience side, concentration on the content may be disturbed when, for example, there is a telephone call when the content is reproduced whilst being seated. It is difficult to adjust the content to induce the viewers to concentrate on a lecture and not to miss important points of the content in accordance with the degree of the content importance.

Systems for monitoring situations of audience in respective scenes of content delivery have been conventionally proposed. For example, Japanese Patent Application Laid-Open No. 2005-56205 and Japanese Patent Application Laid-Open No. 2007-82022 propose such systems.

SUMMARY

When entertainment content such as a movie is provided by delivery, viewing situations of users are recognized according to how much emotions of viewers are stimulated, the content is evaluated according to emotional viewing situations of the users, and a content providing service is established on the basis of the evaluation.

However, when content of E-learning or a speech are provided by delivery, since emotional audience reactions are not often seen in individual expressions, it is difficult to change a content providing service on the basis of audience emotional situations. Further, in the case of the provision of the content of E-learning or a speech, the content includes important details to be communicated to the audience. Therefore, it is desired to provide the content while ensuring that the audience does not miss the important points.

To allow the audience to view the content without missing the important points of the content, the following two points are at issue. (1) Since audience emotional reactions are not often seen in E-learning or a lecture, reactions of other users may not be useful references to estimate when important points are voiced. (2) When the audience receives the content of E-learning or a lecture whilst being seated, there may be an individual who is disturbed by an incoming telephone call or the like. Such an individual fails to acquire important content.

One aspect of the embodiment is a non-transitory computer readable storage medium storing a content providing program causing a computer to execute content provision processing including:

acquiring a first viewing situation of a first viewer viewing a provided content in association with time when the content is provided;

registering, on the basis of the first viewing situation, as feedback desirable content, missed content in a time segment in which the first viewer is likely to have failed to view the content;

estimating, on the basis of the first viewing situation of the first viewer, a state in which the first viewer is enabled to view the content; and providing the first viewer with the feedback desirable content in a time segment in which estimation is made that the first viewer is in a viewable state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram for explaining the feedback desirable content registration processing.

FIG. 11 is a diagram for explaining a composite content creating step.

FIG. 15 is a diagram depicting an example of the attentive audience sensing data.

FIG. 16 is a diagram depicting an example of a window coordinate history and a displayed content history in a screen.

FIG. 17 is a diagram depicting an example of content of one of registered data of the server Ts.

FIG. 20 is a diagram depicting an example of a viewing score, which is one of evaluation data.

FIG. 21 is a diagram depicting an example of a viewing situation, which is one of the evaluation data.

FIG. 22 is a diagram depicting an example of control data of the viewing controllable level, which is one of the registered data.

FIG. 23 is a diagram depicting an example of importance evaluation data of content.

FIG. 24 is a diagram depicting a registration example of feedback content.

FIG. 26 is a diagram depicting an example of feedback reservation data.

DESCRIPTION OF EMBODIMENTS

[Overview of an Embodiment]

First, an overview of processing by a content providing apparatus and a content providing program in an embodiment is explained.

Figure 1:
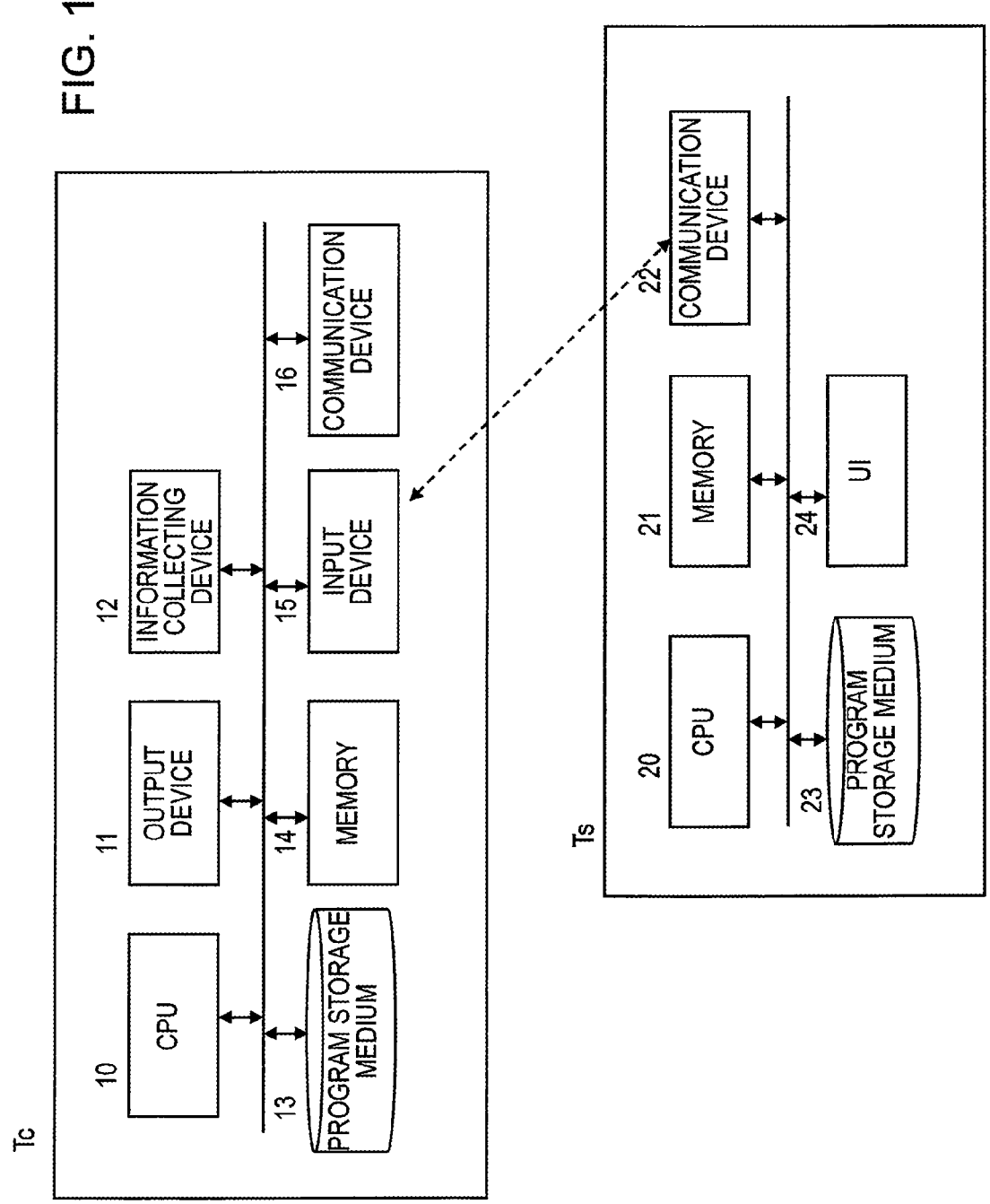
FIG. 1 is a configuration diagram of the content providing apparatus.

FIG. 1 is a configuration diagram of the content providing apparatus. The content providing apparatus is a server-side information processing apparatus Ts that provides a client-side information processing apparatus Tc with content. The server-side information processing apparatus Ts (hereinafter simply referred to as server Ts) is, for example, a personal computer or a server. The server Ts includes a CPU 20, which is a processor, a memory 21, a communication device 22, a user interface 24 such as a keyboard or a display device, and a storage medium 23 configured to store a content providing program and the like on the server side.

On the other hand, the client-side information processing apparatus Tc is, for example, a cellular phone, a smart phone, a pad terminal, or a personal computer owned by a viewer of content. The client-side information providing apparatus Tc includes a CPU 10, which is a processor, an output device 11 such as a display device configured to display content or a sound output device, an information collecting device 12 configured to sense attentive audience sensing data of the viewer, a storage medium 13 configured to store a client-side program, a memory 14, an input device 15, and a communication device 16.

The server Ts transmits content to the client-side information processing apparatus Tc (hereinafter simply referred to as client Tc) via a communication line. The client Tc provides the viewer with the content from the output device 11. The client Tc collects, with the information collecting device 12, attentive audience sensing data of the viewer during the content provision and transmits the attentive audience sensing data to the server Ts via the communication line. The information collecting device 12 is, for example, a camera or a recorder that collects, for example, information concerning a state of the viewer such as information concerning a visual attention of the viewer on a display screen or information concerning whether the viewer is present in front of the display screen, whether the viewer faces a direction other than the display screen, whether the viewer has left the front of the display screen because of an interrupting telephone call or a visitor, or whether the viewer has returned to the front of the display screen.

The server Ts processes the collected attentive audience sensing data and calculates or evaluates a viewing situation of the viewer for the content. The server Ts registers, as feedback desirable content, content in a time segment in which it is estimated on the basis of the viewing situation that the viewer is likely to have failed to view the content. Thereafter, the server Ts causes the output device 11 of the client Tc to provide the viewer with the feedback desirable content in a time segment in which it is estimated on the basis of a same viewing situation of the same viewer during the same or different content provision that the viewer is in a viewable state.

Further, the server Ts evaluates, on the basis of viewing situations of the viewers, content in a time segment, in which a plurality of viewers is likely to have viewed at own wills of the viewers, to be important. The server Ts narrows down the feedback desirable content to the content evaluated as being important and providing the content C1 via the screen of the output device 11.

In FIG. 1, the server Ts and the client Tc may be one information processing apparatus. A plurality of the clients Tc may be connectable to the server Ts via the communication line. The server Ts may perform provision of content, collection of actual visual sensing data, and provision of feedback content for each of the plurality of clients Tc.

The client Tc provides content corresponding to a user, who is a viewer. The attentive audience sensing data collected by the client Tc is stored on a system of the client Tc or the server Ts in association with the user. That is, an identity of a certain user is confirmed by the client Tc or the server Ts. Data collection and content provision are performed for the confirmed user.

Similarly, the content presented by the client Tc are provided according to a display of the output device 11. The attentive audience sensing data collected by the information collecting device 12 of the client Tc is stored on the system of the client Tc or the server Ts in association with the display. That is, an identity of a screen of a display of a certain output device 11 is confirmed by the client Tc or the server Ts. Data collection and content provision are performed for the confirmed display.

[First Content Provision Processing]

Figure 2:
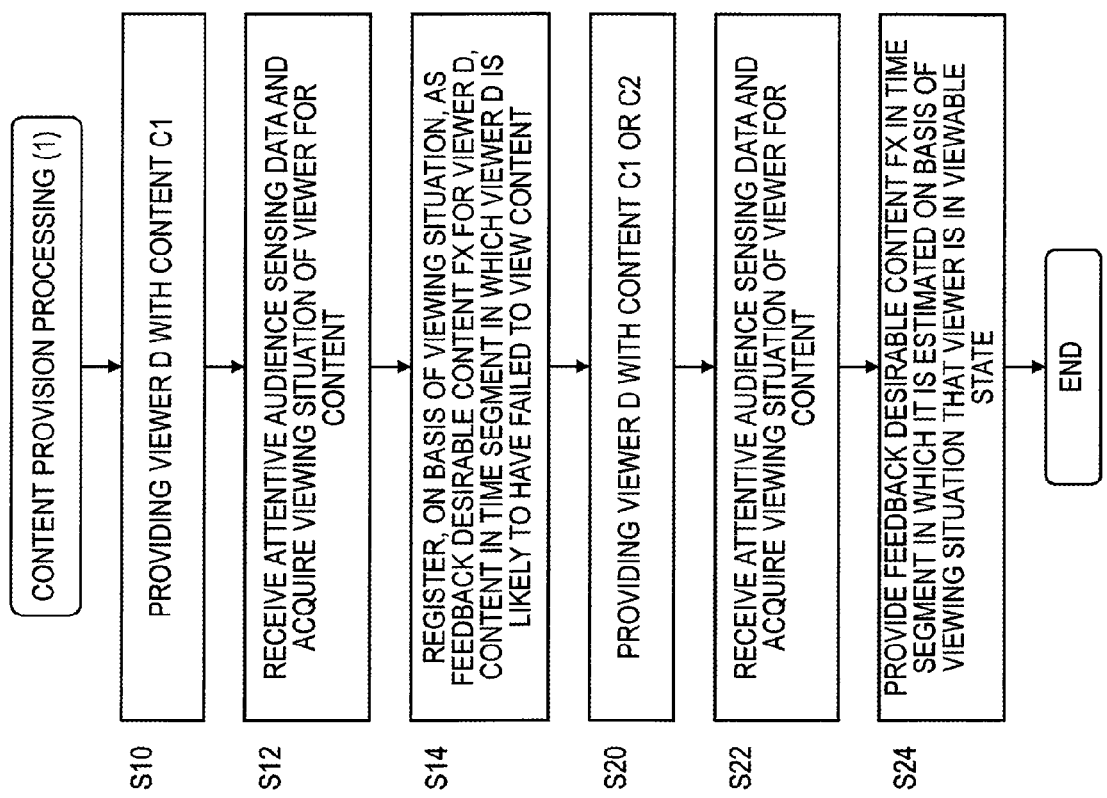
FIG. 2 is a flowchart of first content provision processing in this embodiment.

FIG. 2 is a flowchart of first content provision processing in this embodiment. The processor 20 of the server Ts executes a content provision processing program in the program storage medium 23 to perform the content provision processing. Processing steps S10 to S24 of the flowchart are explained below.

Processing Step S10

In FIG. 1, a viewer D is seated in front of the screen of the output device 11 of the client Tc. Content C1 is provided to the viewer D. That is, the server Ts is providing the content C1 by transmitting the content C1 to the client Tc of the viewer D and providing the content C1 via the screen of the output device 11 (S10).

Processing Step S12: Viewing Situation Acquiring Step

While providing the viewer D with the content C1 via the screen of the output device 11 of the client Tc of the viewer D as explained above, the server Ts receives attentive audience sensing data for measurement of quantity of an information contact with the content C1 of the viewer D collected by the information collecting device 12 of the client Tc and acquires, that is, calculates and records a viewing situation of the viewer D for the content C1 (S12). As explained in detail below, the attentive audience sensing data includes visual attention area data of a region to which a visual attention of a user, who is the viewer D, is directed, event recognition data of an event that occurs in the user such as leaving from a seat of the user, and property data includes login/logoff, turning on/off of a screen saver function. The server Ts acquires a viewing situation of the viewer D for the content C1 on the basis of the attentive audience sensing data. A calculation method is explained in detail below.

In this embodiment, the viewing situation includes a viewing receptive level and a viewing controllable level. The viewing receptive level is an index indicating to which degree a viewer can view content. The viewing controllable level is an index indicating to which degree a viewer can control a viewing situation.

The viewing receptive level is measured on the basis of the visual attention area data according to a degree of a visual attention staying in a display region of the content. The viewing controllable level is measured on the basis of the event recognition data and the property data according to a degree that the viewer can control whether the viewer views the content without leaving the seat and without starting the screen saver. Therefore, the viewing receptive level and the viewing controllable level are also explained in detail below.

Processing Step S14: Feedback Desirable Content Registering Step

The server Ts registers, on the basis of a viewing situation for the content C1 in the screen of the viewer D, as feedback desirable content FX, content in a time segment in which the viewer D is likely to have failed to view the content C1. The time segment in which the viewer D is likely to have failed to view the content C1 is a time segment in which the viewing receptive level of the viewing situation is low, for example, time in which the visual attention stays in a region in the screen where content is displayed is short.

Content in a time segment in which, in addition to the condition that the viewing receptive level is low, a condition that a viewer is likely to be unable to control a viewing situation, that is, the visual controllable level of the viewing situation is low is satisfied may be registered as the feedback desirable content FX.

Processing Step S20

Subsequently, the server Ts is providing the viewer D with content C1 or C2 via the screen of the client Tc of the viewer D (S20). The content C1 is the same as the content C1 provided in the processing steps S10, S12, and S14. The content C2 is different content.

Processing Step S22: Viewing Situation Acquiring Step

While providing the viewer D with the content C1 or C2 via the screen of the output device 11 of the client Tc of the viewer D as explained above, the server Ts receives attentive audience sensing data for measurement of quantity of an information contact with the content C1 or C2 of the viewer D collected by the information collecting device 12 of the client Tc and acquires, that is, calculates and records a viewing situation of the viewer for the content C1 or C2 (S22). The viewing situation is the same as the viewing situation acquire in the processing step S12 and includes a viewing receptive level and a viewing controllable level.

Processing Step S24: Feedback Desirable Content Provision Processing Step

The server Ts provides the viewer D with the registered feedback desirable content FX of the content C1 via the screen of the viewer D in a time segment in which it is estimated on the basis of a viewing situation for the content C1 or C2 in the screen of the client Tc of the viewer D that the viewer D is in a screen viewable situation (S24). The feedback desirable content FX is provided, for example, on another window beside a window on which the content C1 or C2 being viewed is displayed. As the feedback desirable content FX, content itself to be fed back may be provided, a abridged version of the content may be provided, or a screen for informing the content may be provided.

In the first content provision processing, while providing the viewer D with the content C1, the server Ts registers, on the basis of the viewing situation calculated from the attentive audience sensing data, as the feedback desirable content FX, the content in the time segment in which the viewer D is likely to have failed to view the content. Thereafter, while providing the same viewer D with the same content C1 or the different content C2, the server Ts provides the viewer D with the feedback desirable content FX targeting the time segment in which it is estimated on the basis of the viewing situation calculated in the same manner that the viewer D is in the viewable state. Therefore, even in content for which an emotional viewing situation is less easily obtained such as a lecture or E-learning, by using the attentive audience sensing data for quantity of information contact measurement, it is possible to detect content in a time segment in which the viewer D is likely to have failed to view the content rather than attentive audience sensing data for measurement for quantity of emotion for the content. Further, by using the attentive audience sensing data for quantity of information contact measurement, it is possible to provide the feedback desirable content in the time segment in which it is estimated that the viewer D is in the viewable state.

[Second Content Provision Processing]

Figure 3:
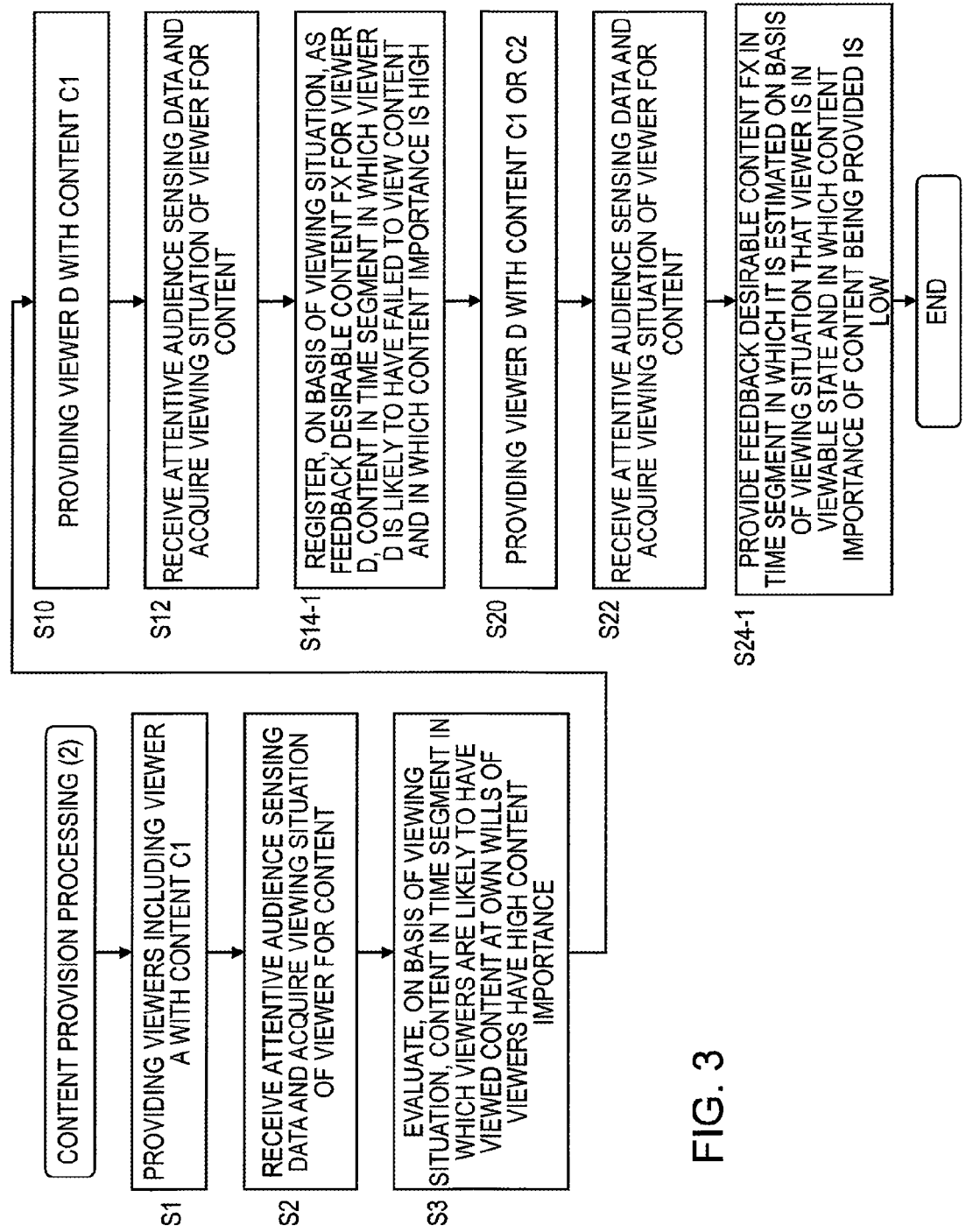
FIG. 3 is a flowchart of second content provision processing in this embodiment.

FIG. 3 is a flowchart of second content provision processing in this embodiment. The processor 20 of the server Ts executes the content provision processing program in the program storage medium 23 to perform the content provision processing. Processing steps S1 to S3 of the flowchart are processing steps for evaluating the importance of the content C1 (content importance). Processing steps S10 to S24-1 are similar the processing steps S10 to S24 of the first content provision processing in FIG. 2. However, the processor 20 performs the processing steps S14-1 and S24-1 taking into account the content importance. These processing steps are explained below.

Processing Step S1

In FIG. 1, a plurality of viewers including the viewer A are respectively seated in front of screens of the output devices 11 of the clients Tc of the viewers including the viewer A. The content C1 is provided to the viewers including the viewer A. That is, the server Ts is providing the content C1 by transmitting the content C1 to the clients Tc of the viewers including the viewer A and causing the clients Tc to output the content C1 to the screens of the output devices 11 (S1).

Processing Step S2: Viewing Situation Acquiring Step

While providing the viewers including the viewer A with the content C1 via the screens of the output devices 11 of the clients Tc of the viewers including the viewer A as explained above, the server Ts receives attentive audience sensing data for measurement of quantity of an information contact with the content C1 of the viewers including the viewer A collected by the information collecting devices 12 of the clients Tc and acquires, that is, calculates and records viewing situations of the viewers including the viewer A for the content C1 (S2). As in the processing step S12, the calculated viewing situation includes a viewing receptive level and a viewing controllable level.

Processing Step S3: Content Evaluating Step

The server Ts evaluates, on the basis of the acquired viewing situations of the viewers including the viewer A, content in a time segment, in which the viewers including the viewer A are likely to have viewed the content at own wills of the viewers, to have high viewing importance (S3). That is, the server Ts totalizes calculated and recorded respective viewing situation data of the viewers including the viewer A and calculates, on the basis of viewing situations of a plurality of viewers who viewed time segments of the content C1, viewing importance of the time segments. The viewing importance means the importance of the content (content importance). The server Ts may calculate the content importance from the viewing importance taking into account provision importance of the content designated by the provider of the content as important. The calculation of the content importance is specifically explained below.

Determination of viewing importance for each of the users is performed by, for example, evaluating that content in a time segment in which the viewing controllable level is high and the viewing receptive level is high has high viewing importance and evaluating that content in a time segment in which, although the viewing controllable level is high, the viewing receptive level is low has low viewing importance. That is, time when the viewing receptive level is high and the viewer directs a visual attention to the content C1 on the screen at an own will of the viewer when the viewing controllable level is high and the viewer is in a viewable state can be regarded as a time segment in which important content is provided. Conversely, time when, although the viewing controllable level is high and the viewer is under the viewable state, the viewing receptive level is low and the viewer does not direct the visual attention to the content C1 on the screen at an own will of the viewer can be regarded as a time segment in which unimportant content is provided.

When the viewers including the viewer A have a plurality of attributes, it is desirable to totalize viewing situation data of the viewers of the respective attributes and perform evaluation of content importance for the viewers having the same attributes. For example, when the viewers including the viewer A are persons belonging to a sales team and persons belonging to a development team, evaluation of content importance is performed on the basis of viewing situation data of the viewers belonging to the sales team. The evaluation of the content importance is used for determination of feedback desirable content for the other viewers belonging to the same sales team. Evaluation of content importance based on viewing situation data of the viewers belonging to the development team is used for determination of feedback desirable content for the other viewers belonging to the same development team.

The content importance for each of the time segments of the content C1 is taken into account, for example, when the feedback desirable content is narrowed down in a processing step S14-1 explained below and is further taken into account when timing for providing the feedback desirable contents is detected in a processing step S24-1 explained below.

The server Ts executes the processing steps S1 to S3 on the content C2 other than the content C1 in the same manner and calculates content importance for the content C2 as well. The content importance of the content C2 is taken into account, for example, when a time segment in which the feedback desirable content of the content C1 is provided during the provision of the content C2 is determined in a processing step S24-1 explained below.

Processing Step S10

In FIG. 1, the viewer D is seated in front of the screen of the output device 11 of the client Tc. The content C1 is provided to the viewer D. That is, the server Ts is providing the content C1 by transmitting the content C1 to the client Tc of the viewer D and causing the client Tc to output the content C1 to the screen of the output device 11 (S10). The viewer D is a viewer having the same attribute as the viewers including the viewer A. This is because the server Ts performs, on the basis of the content importance evaluated on the basis of the viewing situation data from the viewers including the viewer A, the determination on the feedback desirable content registration processing step S14-1 and the feedback processing step S24-1 for the feedback desirable content while providing the viewer D having the same attribute as the viewer A with the content C1. The content C1 is the same as the content C1 of the content evaluation target in the processing steps S1 to S3.

Processing Step S12: Viewing Situation Acquiring Step

As in FIG. 2, while providing the viewer D with the content C1 via the screen of the output device 11 of the client Tc of the viewer D, the server Ts receives attentive audience sensing data for measurement of quantity of an information contact with the content C1 of the viewer D collected by the information collecting device 12 of the client Tc and acquires, that is, calculates and records a viewing situation of the viewer D for the content C1 (S12).

Processing Step S14-1: Feedback Desirable Content Registering Step

In the second content provision processing, content in a time segment in which the viewer D is likely to have failed to view the content and content importance is high is registered as the feedback desirable content FX on the basis of a viewing situation. That is, in the determination of the feedback desirable content FX, the content is narrowed down taking into account content importance. Contents in a time segment in which the viewer D is likely to have failed to view the contents (a time segment in which the viewing receptive level is low) among the contents in the time segment in which the content importance is high are determined as the feedback desirable contents FX.

Processing Step S20

Subsequently, the server Ts is providing the viewer D with the content C1 or C2 via the screen of the client Tc of the viewer D (S20). The processing step S20 is the same as the processing step S20 in FIG. 2.

Processing Step S22: Viewing Situation Acquiring Step

While providing the viewer D with the content C1 or C2 via the screen of the output device 11 of the client Tc of the viewer D as explained above, the server Ts receives attentive audience sensing data for measurement of quantity of an information contact with the content C1 or C2 of the viewer D collected by the information collecting device 12 of the client Tc and acquires, that is, calculates and records a viewing situation of the viewer for the content C1 or C2 (S22). The processing step S22 is the same as the processing step S22 in FIG. 2.

Processing Step S24-1: Feedback Desirable Content Provision Processing Step

The server Ts provides the viewer D with the registered feedback desirable content FX of the content C1 via the screen of the viewer D in a time segment in which it is estimated on the basis of a viewing situation for the content C1 or C2 in the screen of the client Tc of the viewer D that the viewer D is in a screen viewable situation and in which content importance of the content C1 or C2 being provided is low (S24-1).

Unlike the processing step S24 of the first content provision processing, the server Ts provides the feedback desirable content FX in the time segment in which it is estimated on the basis of the viewing situation for the content C1 or C2 being provided that the viewer D is in the screen viewable situation and, in addition, the content importance of the content C1 or C2 being provided is low. Consequently, in the time segment in which the viewer D is in the viewable state and the importance of content being provided is low, it is highly likely that the viewer D views the feedback desirable content FX. Therefore, it is possible to effectively perform feedback of important content that the viewer D failed to view.

As explained above, according to the second content provision processing, content importance is evaluated for each of the time segments concerning the content C1 or C2 on the basis of the viewing situations of the viewers including the viewer A in advance. Therefore, in the determination of feedback desirable content, it is possible to determine a time segment in which content importance is high as a feedback target and appropriately extract feedback desirable content. In the determination concerning whether the feedback desirable content is to be provided, it is possible to determine a time segment in which content importance is low as timing when the feedback desirable content is to be provided and appropriately detect feedback timing.

[Third Content Provision Processing]

Figure 4:
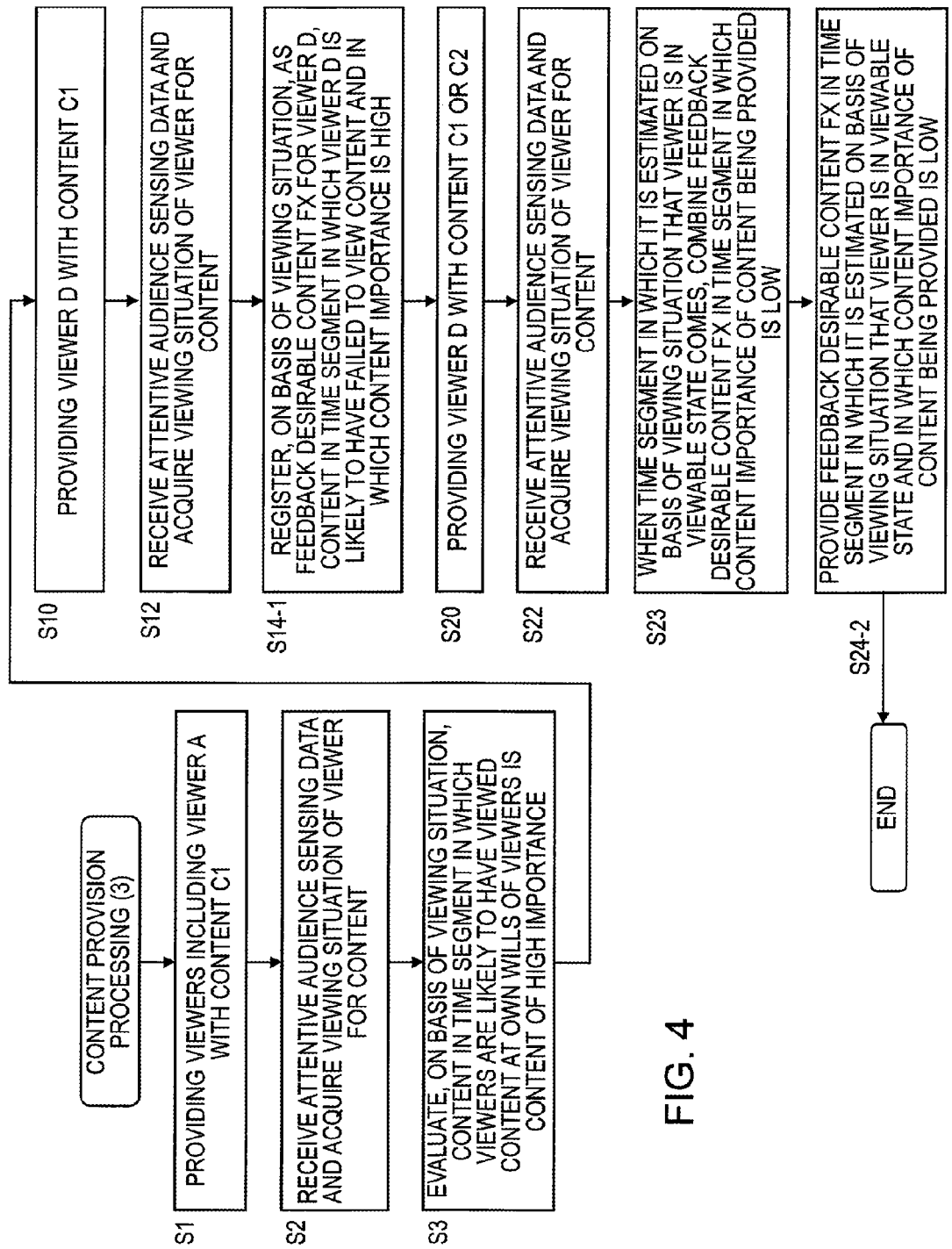
FIG. 4 is a flowchart of third content provision processing in this embodiment.

FIG. 4 is a flowchart of third content provision processing in this embodiment. The processor 20 of the server Ts executes the content provision processing program in the program storage medium 23 to perform the content provision processing. Processing steps S1 to S3 of the flowchart are the same as the processing steps S1 to S3 of the second content provision processing in FIG. 3 and are processing steps for evaluating the importance of the content C1 (content importance). Processing steps S10 to S24-2 are similar to the processing steps S10 to S24-1 of the second content provision processing in FIG. 3. However, composite content creation processing S23 for combining the feedback desirable content FX with the content C1 or C2 being provided and creating composite content is added. The added composite content creation processing S23 is explained below.

Processing Step S23: Composite Content Creating Step

In this processing step, the server Ts is providing the viewer D with the content C1 or C2 (S20) and is receiving attentive audience sensing data and calculating and recording a viewing situation of the viewer D for the content C1 or C2 (S22). Therefore, when a time segment in which it is estimated on the basis of the viewing situation that the viewer D is in the viewable state comes, in a time segment in which content importance of the content C1 or C2 being provided is low after the time segment, the server Ts combines the registered feedback desirable content FX of the content C1 with the content C1 or C2 being provided (S23). As in the processing step S24 in FIG. 2 and the processing step S24-1 in FIG. 3, the time segment in which it is estimated that the viewer D is in the viewable state is a time segment in which the viewing receptive level is high and the viewing controllable level is also high. With such a viewable state as a trigger, in a time segment in which content importance of the content C1 or C2 being provided is low after the trigger, the server Ts combines the feedback desirable content Fx of the content C1 with the content C1 or C2 being provided.

Processing Step S24-2: Feedback Desirable Content Provision Processing Step

Thereafter, as in the processing step S24-1 in FIG. 3, in the processing step S24-2, the server Ts provides the composite content at appropriate timing to provide the feedback desirable content FX.

Therefore, the server Ts detects, on the basis of the viewing situation, timing for starting the creation of the composite content and creates the composite content with the timing as a trigger. Therefore, the server Ts only has to provide the composite content in the processing step S24-1.

[Specific Example]

A specific example is explained below concerning the second content provision processing. First, the server Ts provides viewers including the viewer A, who are viewing content in client terminals of the viewers' seats in offices of bases, with moving image content C1 of E-learning in a company. The server Ts acquires and records attentive audience sensing data of the viewers including the viewer A, calculates viewing situations (viewing receptive levels and viewing controllable levels) of the viewers including the viewer A from the data, and records the viewing situations (S2).

From viewing situations of one hundred viewers including the viewer A in the first day, the server Ts determined that a time segment in which both of the viewing receptive levels and the viewing controllable levels were a H level at a high rate was a time segment in which viewing importance of the moving image content A was high. The viewing importance is the same as content importance in principle.

For a viewer D in the second day, when the viewer D was viewing the moving image content C 1in the viewer's seat, a time segment in which both of a viewing receptive level and a viewing controllable level of a viewing situation of the viewer D changed to a low level because of an incoming telephone call or the like was a time segment in which content importance of provided content was high. Therefore, the server Ts registered the time segment as a time segment of feedback desirable content of the moving image content C1.

Thereafter, when the viewer D hang up the telephone, wore a headphone again, and turned to a screen, as the viewing situation of the viewer D, both of the viewing receptive level and the viewing controllable level changed to the H level. Further, at the same time, a scene of the moving image content A changed to a time segment in which content importance was the L level. Therefore, the server Ts provided the viewer D with the feedback desirable content or a abridged version of the feedback desirable content and notified the viewer D that the viewer D was likely to fail to view important content.

The first content provision processing is different from the second content provision processing in that calculation of content importance (S3) is not performed and determination that takes into account the content importance is not performed.

The third content provision processing is different from the second content provision processing in that the processing step S23 for creating composite content in advance is additionally performed.

[Configuration of the Server-Side Information Processing Apparatus]

Figure 14:
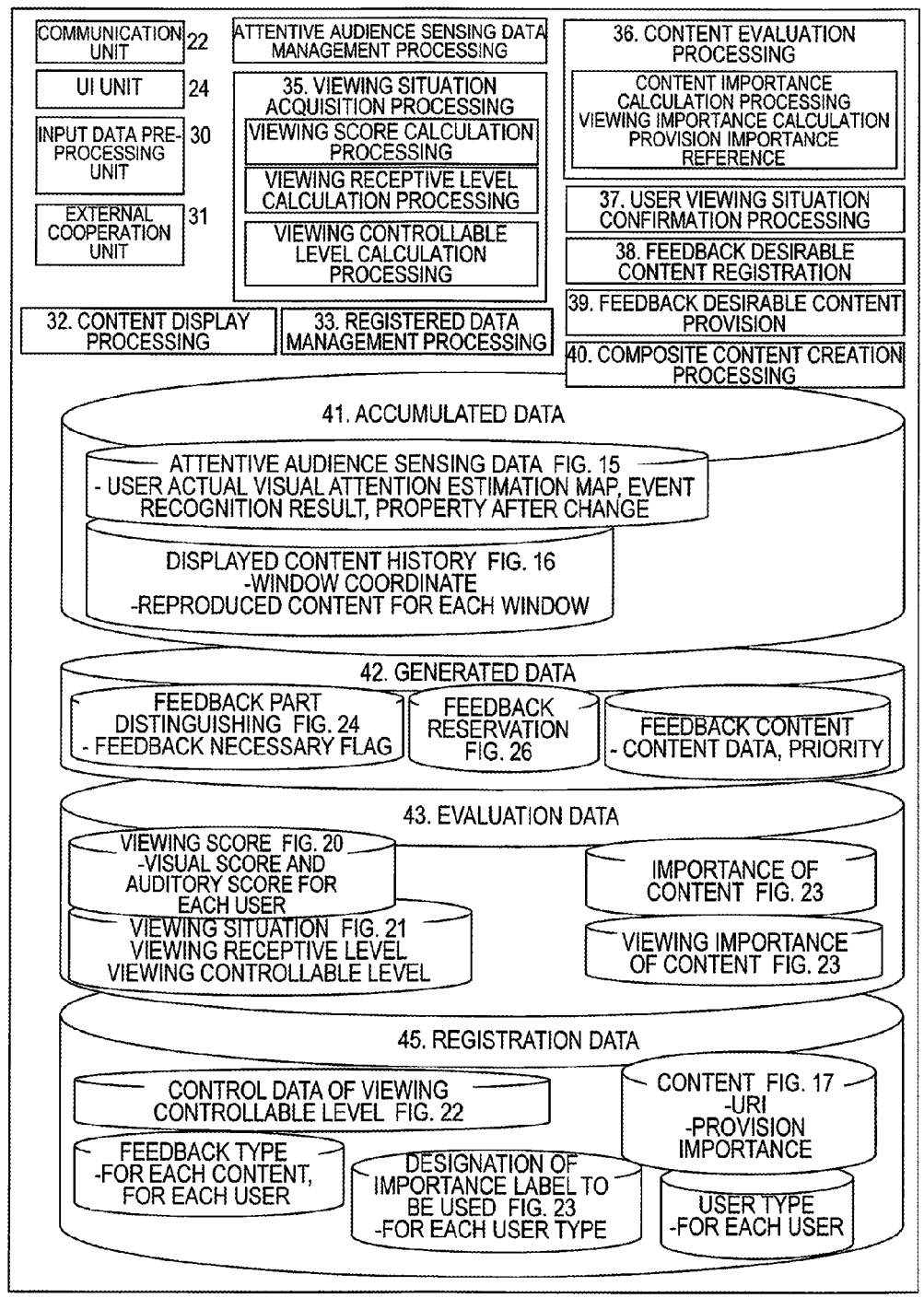
FIG. 14 is a configuration diagram of the server-side information processing apparatus (the server Ts) in this embodiment.

FIG. 14 is a configuration diagram of the server-side information processing apparatus (the server Ts) in this embodiment. The server Ts includes, in addition to the communication device 22 and the user interface 24 depicted in FIG. 1, an input-data pre-processing unit 30 for received attentive audience sensing data or the like and an external cooperation unit 31 configured to cooperate with an external content server. Further, the server Ts stores, in the storage medium 23, computer programs for performing attentive audience sensing data management processing 34, viewing situation acquisition processing 35, content evaluation processing 36, user viewing situation confirmation processing 37, feedback desirable content registration processing 38, feedback desirable content provision processing 39, composite content creation processing 40, UI or content display processing 32, and registered data management processing 33 and executes the computer programs to perform the processing corresponding thereto.

The server Ts has stored, in the storage medium 23 or the memory 21, accumulated data 41, generated data 42, recognition and evaluation data 43, and registered data 45. The registered data 45 includes control data of a viewing controllable level (see FIG. 22), a feedback type (not depicted in the figures) indicating feedback form of feedback desirable content, designation of an importance label to be used (see FIG. 23), content (see FIG. 17), and a user type (not depicted in the figures) indicating a type of a viewer.

The accumulated data 41 retained by the server Ts includes attentive audience sensing data (see FIG. 15) and a displayed content history (see FIG. 16). The generated data 42 includes feedback part distinguishing data (see FIG. 24), feedback reservation data (see FIG. 26), and feedback content data (not depicted in the figures). The evaluation data 43 includes data of a viewing score (see FIG. 20), viewing situation data (see FIG. 21), importance of content (see FIG. 23), and viewing importance of content (see FIG. 23).

The server Ts executes a computer program of content provision processing referring to the data explained above and generates data. The content provision processing is explained in detail below.

[Processing Steps of the Content Provision Processing]

Processing steps of the content provision processing are explained. As explained above, the third content provision processing includes the processing steps same as or similar to all the processing steps of the first and second content provision processing. Therefore, the processing steps S2, S3, S14-1, S23, and S24-2 of the third content provision processing are specifically explained in detail.

[Processing Steps S2, S12, and S22: Viewing Situation Acquiring Steps]

Figure 5:
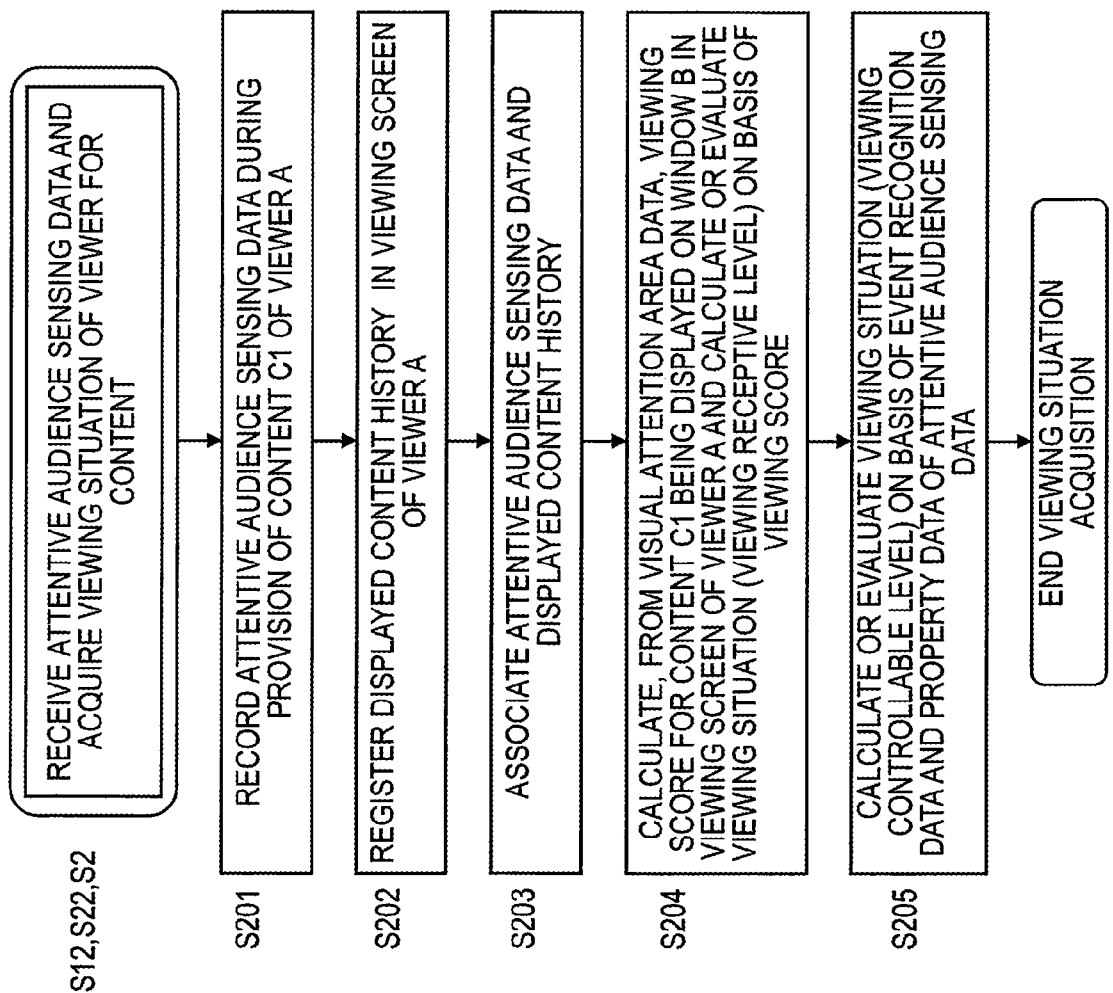
FIG. 5 is a flowchart of the processing steps S2, S12, and S22.

FIG. 5 is a flowchart of the processing steps S2, S12, and S22. The processing step S2 is viewing situation acquisition processing same as the processing steps S12 and S22, although a target viewer or content are sometimes different.

In the processing step S2, when providing the viewers including the viewer A with the content C1, the server Ts receives attentive audience sensing data from the client Ts and acquires, that is, calculates and records viewing situations of the viewers including the viewer A for the content C1. The server Ts executes, as the processing step S2, processing explained below.

S201: Attentive Audience Sensing Data Acquiring Step

When providing the viewers including the viewer A with the content C1, the server Ts receives attentive audience sensing data from the client Ts and records the attentive audience sensing data (S201).

The attentive audience sensing data is collected by the information collecting device 12 of the client Ts. In the attentive audience sensing data, sensing data (a facial expression of a user, a surrounding environmental noise, etc.) used for measuring a degree of an emotion of a viewer is accumulated as attentive audience sensing data for measurement for quantity of emotion. On the other hand, sensing data used for measuring a degree of information contact with content being viewed by the viewer such as a status of seating and leaving seat of the viewer, a visual attention area of the viewer, and terminal operation is accumulated as attentive audience sensing data for quantity of information contact measurement. In this embodiment, the attentive audience sensing data for quantity of information contact measurement is used. This is because, in a lecture and E-learning, it is difficult to acquire data for measurement for quantity of emotion.

FIG. 15 is a diagram depicting an example of the attentive audience sensing data. In FIG. 15, the attentive audience sensing data includes visual attention area data, event recognition data, and property data.

First, the visual attention area data is obtained by, for example, eye gaze tracking of a user, who is a viewer. The eye gaze tracking can be performed by using a special apparatus that measures a motion of the eyeballs. It is also possible to simply specify a eye gaze direction of the user using a Web camera set on a screen B of a display device for content. For example, there is a technique described in, for example, Stylianos Asteriadis et al., "Estimation of behavioral user state based on eye gaze and head pose application in an e-learning environment", Multimed Tools Appl, 2009.

In these eye gaze detection techniques, in data of a visual attention directed to content, time in which the visual attention is directed to the content is represented as data called heat map represented by the area of a circle surrounding positions to which the visual attention is directed per unit time and intensity of overlapping of the circle. In this embodiment, a circle centering on the center of a plurality of positions to which the visual attention is directed in the unit time and covering the positions to which the visual attention is directed is recorded as visual attention information in the unit time.

Figure 18:
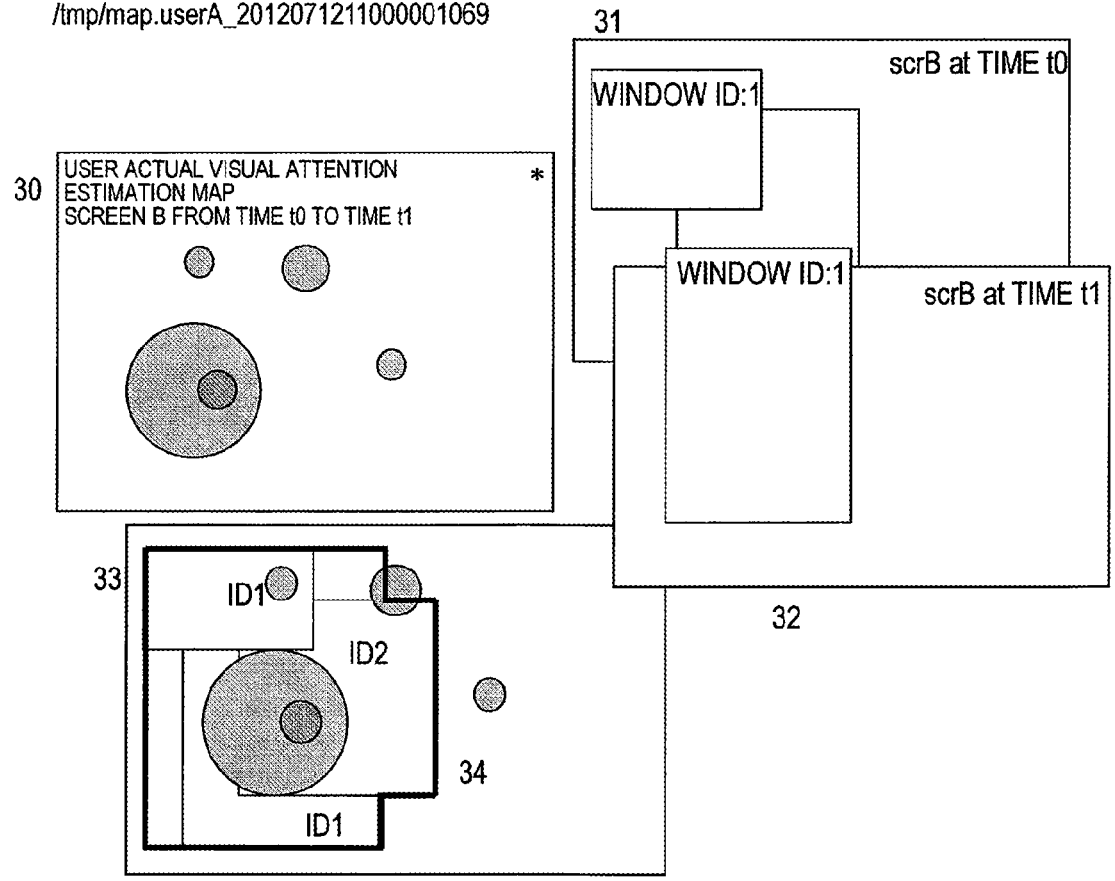
FIG. 18 is a diagram depicting a user actual visual attention estimation map and window coordinate data.

In FIG. 18, an example of a user actual visual attention estimation map between time t0 to time t1 is depicted. As depicted in FIG. 15, in the user actual visual attention estimation map recorded at time t1, circle information recorded after the last recording t0 is recorded in a file. If the unit time of the visual attention recording is included five times between time t0 and time t1, five pieces of the circle information are recorded at the maximum.

Second, the event recognition data is an output result of video analysis software for a video recorded by the Web camera set on the screen B of the display device for content and data received from software for recording seating and leaving from seat. When a video in which a state in front of the screen B of a user A, who is a viewer, is recorded is analyzed, from the position of the face of the person and the direction of the eye gaze of the person, it is possible to calculate in which direction the user A faces. When another user appears behind the user A and the user A turns to the direction of the other user, the user A is considered to be uninterested in content displayed on the screen B. Such an event for increasing and reducing quantity of an information contact with content is recorded as an event recognition result.

In FIG. 15, an event in which the user A faces the direction of the other user and an event in which the user A is away from the seat are recorded as an event recognition result.

Third, the property data is data in which a change in a system property related to a display information amount of the screen B of the display device for content is recorded. For example, if a screen saver is started during content viewing, the user A may be unable to view the content during a screen saver operation period. A property change for increasing and reducing quantity of an information contact with content in this way is recorded together with a property value after change. The change in the property may be a change automatically performed by the system or may include a change voluntarily performed by the user A.

In FIG. 15, a property after change indicating that the screen saver is started is recorded.

S202: Displayed Content History Registering Step

The server Ts registers a displayed content history in a screen that the viewers including the viewer A are viewing (S202).

FIG. 16 is a diagram depicting an example of a window coordinate history and a displayed content history in a screen. FIG. 17 is a diagram depicting an example of content of one of registered data of the server Ts. FIG. 18 is a diagram depicting a user actual visual attention estimation map and window coordinate data. In FIG. 18, an example of an actual visual attention estimation map and a window coordinate from time t0 to time t1 is depicted.

The window coordinate history and the displayed content history in the viewing screen depicted in FIG. 16 are explained. A user is sometimes simultaneously viewing a plurality of screens. A user sometimes displays a plurality of windows in one screen. Therefore, a history is recorded to distinguish which users are viewing which windows in which screens. In what kinds of state the windows are arranged on the screens and which content is displayed in the windows are accumulated as a history. In this case, even when content is displayed in a first window, in some case, the first window is hidden under another second window and the user A is not actually viewing the content in the first window. Therefore, in a table of window coordinates, not only data representing display positions and display sizes of windows but also overlaying order of the windows is recorded.

In the displayed content history, it is recorded which users display which windows on which screens. In the example depicted in FIG. 16, it is recorded that window ID:1 and window ID:2 are simultaneously displayed at time t0 and only window ID:1 is displayed at time t1.

In FIG. 17, concerning content, which is registered data, a URI in which the content is stored and provision importance in each of time segments (time slots) of the contents is recorded for each of content IDs (C1, C2, etc.). The content IDs are cited in the displayed content history.

The provision importance of content is data indicating importance how much a content providing side desires to inform a viewer. The provision importance of content is provided from a content provider.

S203: Associating Step

The server Ts associates the attentive audience sensing data in FIG. 15 and the displayed content history in FIG. 16 using timestamp (S203).

S204: Viewing Receptive Level Calculating Step

The server Ts calculates, from the visual attention area data, a viewing score for the content C1 being displayed on a window in a screen that the viewers including the viewer A are viewing and calculates a viewing receptive level in a viewing situation on the basis of the viewing score (S204). The viewing score is a numerical value representing how much amount of content is viewed by the user A.

In FIG. 18, an example of a user actual visual attention estimation map and window coordinate data from time t0 to time t1 is depicted. In the example, in the viewing score, a score indicating to which degree the user A has viewed the content C1 using the visual sense is calculated according to a visual attention staying area of the user A. However, a score indicating to which degree the user A has listened to the content C1 using the auditory sense may be calculated by taking into account the sound volume of the display screen B for content and a surrounding noise level.

A user actual visual attention estimation map 30 of the screen B from time t0 to time t1 records five circles. As explained above, the circles respectively indicate regions where the visual attention stayed in the respective five sections between time t0 and time t1. This means that, as the circles overlay more, time of the stay of the visual attention is longer.

Two windows are displayed on a screen B31 at time t0. One window is displayed on a screen B32 at time t1. Based on the premise that it is not recorded at which timing from time t0 to time t1 the window ID:2 has disappeared, it may be impossible to accurately calculate by which amounts the content C1 and the content C2 displayed on the window ID:1 and the window ID:2 are respectively viewed. In this embodiment, on the assumption that an interval between time t0 and time t1 is very small, a viewing score at the point of time t1 is calculated only for the content C1 displayed on the window ID:1 present at time t1.

A composite image 33 is an image obtained by windows of screens and circles of the actual visual attention estimation map at time t0 and time t1.

Figure 19:
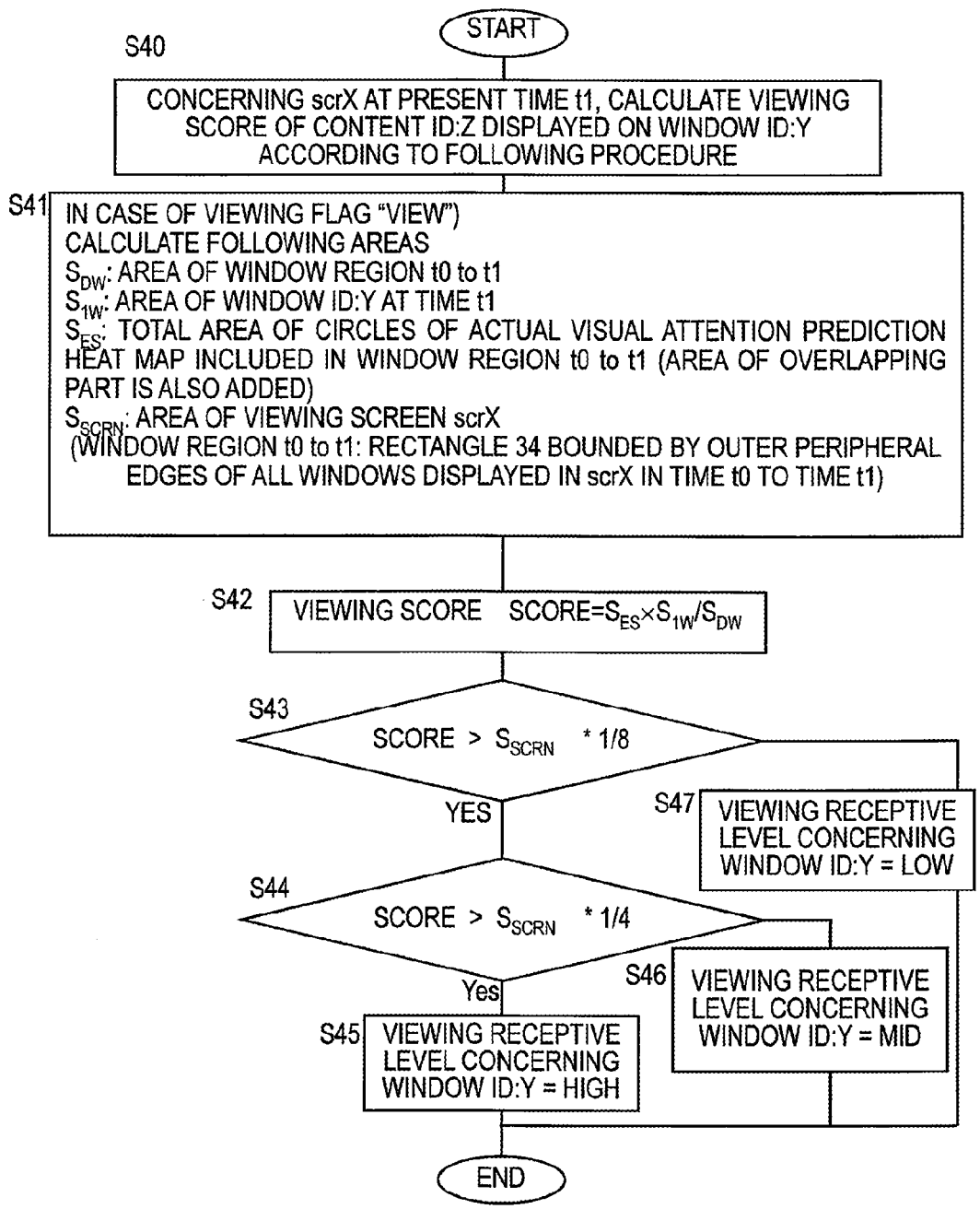
FIG. 19 is a flowchart of calculation of a viewing score and a viewing receptive level.

FIG. 19 is a flowchart of calculation of a viewing score and a viewing receptive level. A viewing score for the content C1 displayed on the window ID:1 is calculated by, as indicated in step S42, distributing a total area $S_{ES}$ of circles located in a black frame 34 depicted in the composite image 33 in FIG. 18 at a ratio of the area of the window ID:1, on which the content C1 is displayed, to the area of the black frame 34.

That is, the viewing score for the content C1 displayed on the window ID:1 is calculated by multiplying the total area $S_{ES}$ of the circles located in the black frame 34 with a ratio $(S_{1W}/S_{DW})$ of an area $S_{1W}$ of the widow ID:1 at time t1 to an area $S_{DW}$ of a rectangle 34 bounded by outer peripheral edges of all windows displayed between time t0 and time t1 (S40, S41, and S42).

FIG. 20 is a diagram depicting an example of a viewing score, which is one of evaluation data. In FIG. 20, [8000] is recorded as a viewing score for the content C1 in the screen B of the user A in a time segment from time t0 to time t1.

As explained above, in this embodiment, a viewing situation is represented by two levels, i.e., a viewing receptive level and a viewing controllable level. The viewing receptive level indicates to which degree content can be viewed. The viewing controllable level indicates to which degree a viewing person can control the viewing situation. Both the levels may be represented by a continuous quantity or may be represented by a discrete quantity. In this embodiment, the levels are represented by levels in three stages (Low, Mid, and High).

For example, in a state in which the viewing receptive level is high, in some case, a visual attention stays in a window on which content is displayed and the window spreads to an entire viewing screen. In a state in which the viewing controllable level is low, in some case, control related to content viewing is difficult while he/she leaves his/her seat.

In FIG. 19, evaluation of the viewing receptive level is performed using the viewing score calculated in step S42. In this example, the viewing receptive level in the screen B of the user A from time t0 to time t1 is evaluated with reference to a degree of spread of the viewing score (a kind of area) of a window displayed at time t1 into a screen area. In an example depicted in FIG. 19, when a viewing score SCORE concerning a window ID:Y exceeds a certain fixed value (¼) with respect to a screen area $S_{SCRN}$, the viewing receptive level is evaluated as High (YES in S44, S45). When the viewing score SCORE exceeds the next fixed value (⅛), the viewing receptive level is evaluated as Middle (NO in S44, S46). When the viewing score SCORE is smaller than both of the fixed value (¼) and the fixed value (⅛), the viewing receptive level is evaluated as Low (NO in S43, S47). As the fixed values, assuming that a neighboring value of a maximum score of the viewing score is the area of the viewing screen, when an amount exceeding ¼ of the maximum score is a viewing score of the window ID:Y, the viewing receptive level is assumed to be a High level. At time t1, when a plurality of windows are present, a maximum viewing receptive level in the windows can be calculated as a viewing receptive level of the entire screen.

FIG. 21 is a diagram depicting an example of a viewing situation, which is one of the evaluation data. In FIG. 21, as the viewing situation for the content C1 in the screen B of the user A in the time segment from time t0 to time t1, it is recorded that the viewing receptive level is Middle and the viewing controllable level is Middle.

S205: Viewing Controllable Level Calculating Step

Referring back to FIG. 5, the server Ts calculates the viewing controllable level, which is the other of the viewing situation, on the basis of the event recognition data and the property data of the attentive audience sensing data (S205).

FIG. 22 is a diagram depicting an example of control data of the viewing controllable level, which is one of the registered data. In this example, Facing to other people, Away their seat, Facing to Screen, Back to their seat, Screen ON: False, Screen Saver OFF: False, Login ON: True, and the like are registered.

The viewing controllable level is changed on the basis of a property, which is an event for incrementing or decrementing the registered viewing controllable level. For example, as depicted in FIG. 22, a registered event "Facing to other people" is an event in which the viewing controllable level is to be changed to Low because a user faces another user. A property change "Login ON: True" indicating that a login state is changed to ON is a property change in which the viewing controllable level is to be changed to High.

An event and a property change that occur between time t0 and time t1 are accumulated as the attentive audience sensing data depicted in FIG. 15. When an event or a property change that affects the viewing controllable level is present in the attentive audience sensing data, the event or the property change is associated with events and properties depicted in FIG. 22. A control value for the event registered in FIG. 22 in advance is adopted as a viewing controllable level of the time segment.

In the example depicted in FIG. 22, since a control flag is "absolute value change", when an event or a property change occurs, a value of the viewing controllable level is immediately set as a control value for the event or the property change. On the other hand, for example, when there are a plurality of events or property changes within a fixed time, control values for the events or the property changes may be added to or subtracted from the present level and changed as relative values.

When an absolute value change is performed, when there are a plurality of events or property changes within a fixed time, a control value may be determined preferentially for a last event or property change within a fixed time or a most strict or loosest control value may be adopted. In the example of the evaluation data of the viewing situation depicted in FIG. 21, a viewing receptive level and a viewing controllable level in a certain screen of a certain user in a certain time segment are associated and recorded. When needed, viewing situations may be evaluated and recorded concerning each of display content in a screen.

Step S2 in FIG. 5 is as explained above. In steps S12 and S22, only a viewer and content being provided are different. A viewing situation is calculated or estimated as in the steps in FIG. 5.

[Processing Step S3: Content Evaluating Step]

Figure 6:
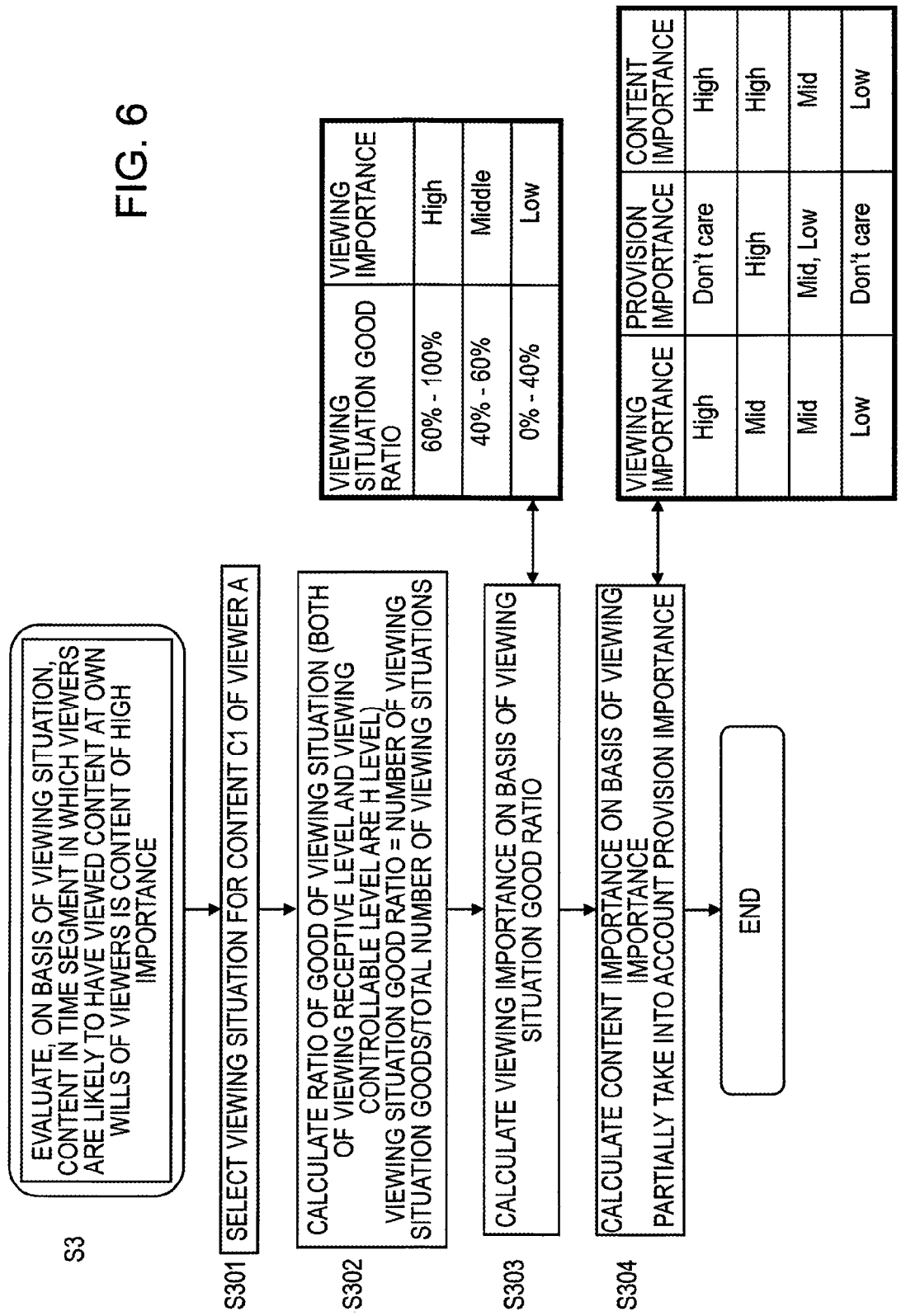
FIG. 6 is a flowchart of the processing step S3.

FIG. 6 is a flowchart of the processing step S3. In the processing step S3, the server Ts evaluates, on the basis of the calculated or estimated viewing situations of the viewers, content in a time segment in which the viewers are likely to have viewed the contents at own wills of the viewers has high viewing importance. That is, the server Ts calculates viewing importance on the basis of a viewing situation Good ratio indicating that a ratio of a viewing situation Good in which both of the viewing receptive level and the viewing controllable level of the viewing situation are the H level is high. The server Ts evaluates content in the time segment (the time slot) having the high viewing importance to be content of high importance. Further, the server Ts may evaluate the content importance taking into account provision importance, which is importance for the content provider side.

FIG. 23 is a diagram depicting an example of importance evaluation data of content. In FIG. 23, a temporarily-created content viewing situation list, importance label designation to be used, which is one of registered data, and content importance, which is evaluation data, are depicted. Time slots in FIG. 23 may be fixed times or may be unfixed times. In this example, the times slots are fixed times. For example, a time slot: 1 of the content C1 is from a start 0 second of content to 1 second, and a time slot: 2 is from the start 1 second to 2 second. Processing steps S301 to S304 in FIG. 6 are explained below with reference to the time slots.

S301: Viewing Situation Data Collecting Step

The server Ts collects data of viewing situations for the content C1 of viewers in a group whose content is desired to be evaluated among the viewers including the viewer A (S301). For example, the server Ts collects data of viewing situations for the content C1 of viewers in a sales group.

Specifically, the server Ts collects window and content display histories concerning the content ID: C1 on the basis of the data depicted in FIG. 16. The displayed content history includes all records of all users. Therefore, when content evaluation is performed, when content is evaluated for a certain user group, it is preferable to evaluate the content using only data concerning the user group. For example, when evaluation target content is an explanation video concerning a product E, it is assumed that a point important for a user in charge of sales of the product E and a point important for a user planning to purchase the product E are different. For example, concerning the content C1, there is already a past viewing log in an office where a large number of people in charge of sales are registered. The server Ts extracts only data collected on Jul. 12, 2012 depicted in FIG. 16 from a database to extract only viewing situation data of the past viewing log data. As explained below, the server Ts calculates importance of content in the time slots from a viewing situation on Jul. 12, 2012 of the content ID: 1.

S302: Viewing Situation Good Ratio Calculating Step

The server Ts calculates a ratio of a good viewing situation (S302). As depicted in FIG. 23, the good viewing situation (viewing situation Good) means that both of a viewing receptive level and a viewing controllable level are the H level in corresponding time slots in the collected data on Jul. 12, 2012. A viewing situation Good ratio of a time slot 1 at this point is calculated as percentage of viewing situation Good in the time slot 1 with respect to a total number of viewing situation data of the time slot 1 of the collected data on Jul. 12, 2012.

S303: Viewing Importance Calculating Step

The server Ts calculates viewing importance on the basis of the viewing situation Good ratio (S303). As depicted in FIG. 6, the viewing importance is determined as Middle if the viewing situation Good ratio is between 40% and 60%, determined as Low if the viewing situation Good ratio is equal to or lower than 40%, and determined as high if the viewing situation Good ratio is equal to or higher than 60%.

S304: Content Importance Calculating Step

The server Ts calculates content importance on the basis of the viewing importance (S304). Basically, the content importance is the same as the viewing importance. However, the server Ts may calculate the content importance partially taking into account provision importance. In that case, the server Ts determines the importance of the time slots of the content on the basis of the provision importance and the viewing importance. For example, as depicted in FIG. 6, basically, the viewing importance is the content importance. That is, the content importance=the viewing importance. However, concerning a time slot, provision importance of which is determined as the H level on the provision side, even if viewing importance of a user group, which has already viewed content, set as a target this time is the Middle level, the server Ts evaluates content importance as the H level. In this way, the server Ts performs content evaluation setting a higher value on the viewing importance.

After the content evaluation, all temporarily created data depicted in FIG. 22 may be left. However, for which user group importance is evaluated may be managed as an importance label. The importance of the time slots of the evaluated content and the importance label are associated. Consequently, it is possible to manage importance evaluation data of content for each of user groups.

The viewing importance may limit data used for calculation according to time, a user, a screen, and the like.

In FIG. 23, an example of registered data of the importance label to be used for each of the user groups is depicted. The content importance is recorded for each of importance labels and for each of the time slots of the content C1.

Figure 7:
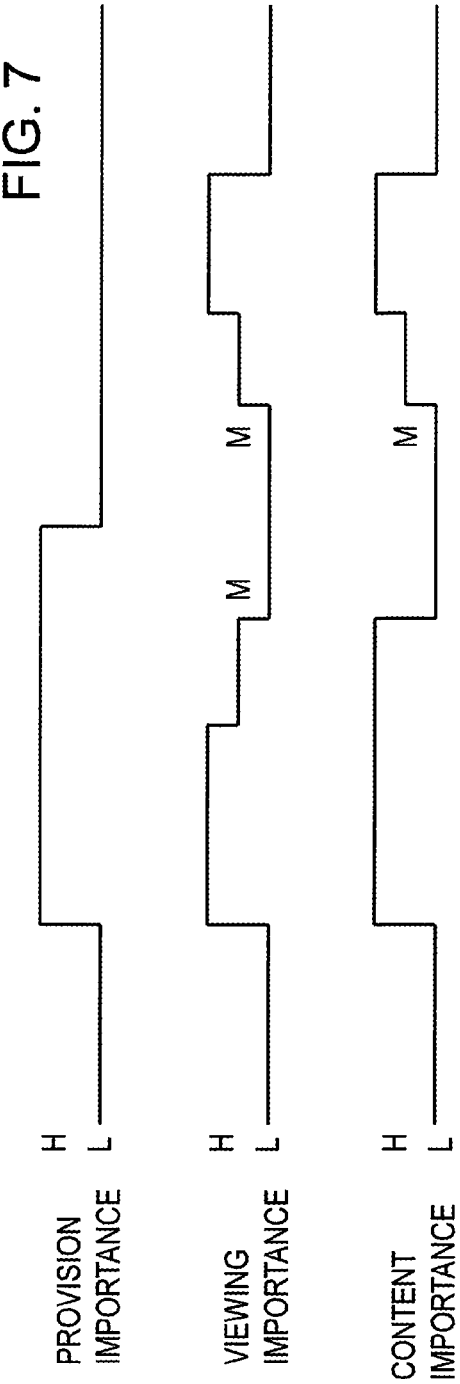
FIG. 7 is a diagram depicting, as a specific example, an example in which content importance of the content C1 of the user A is evaluated for each of time slots.

FIG. 7 is a diagram depicting, as a specific example, an example in which content importance of the content C1 of the user A is evaluated for each of time slots. The lateral direction corresponds to 1 to N of a time slot tsl. Provision importance and viewing importance corresponding to the time slot tsl are depicted. Content importance evaluated on the basis of the provision importance and the viewing importance is depicted. In this specific example, the content importance is evaluated as the H level when the time slot tsl is 3 to 10. In particular, when the time slot tsl is 10, the content importance is the H level because the viewing importance is Middle but the provision importance is High level.

[Processing Steps S14 and S14-1: Feedback Desirable Content Registering Step]

Figure 8:
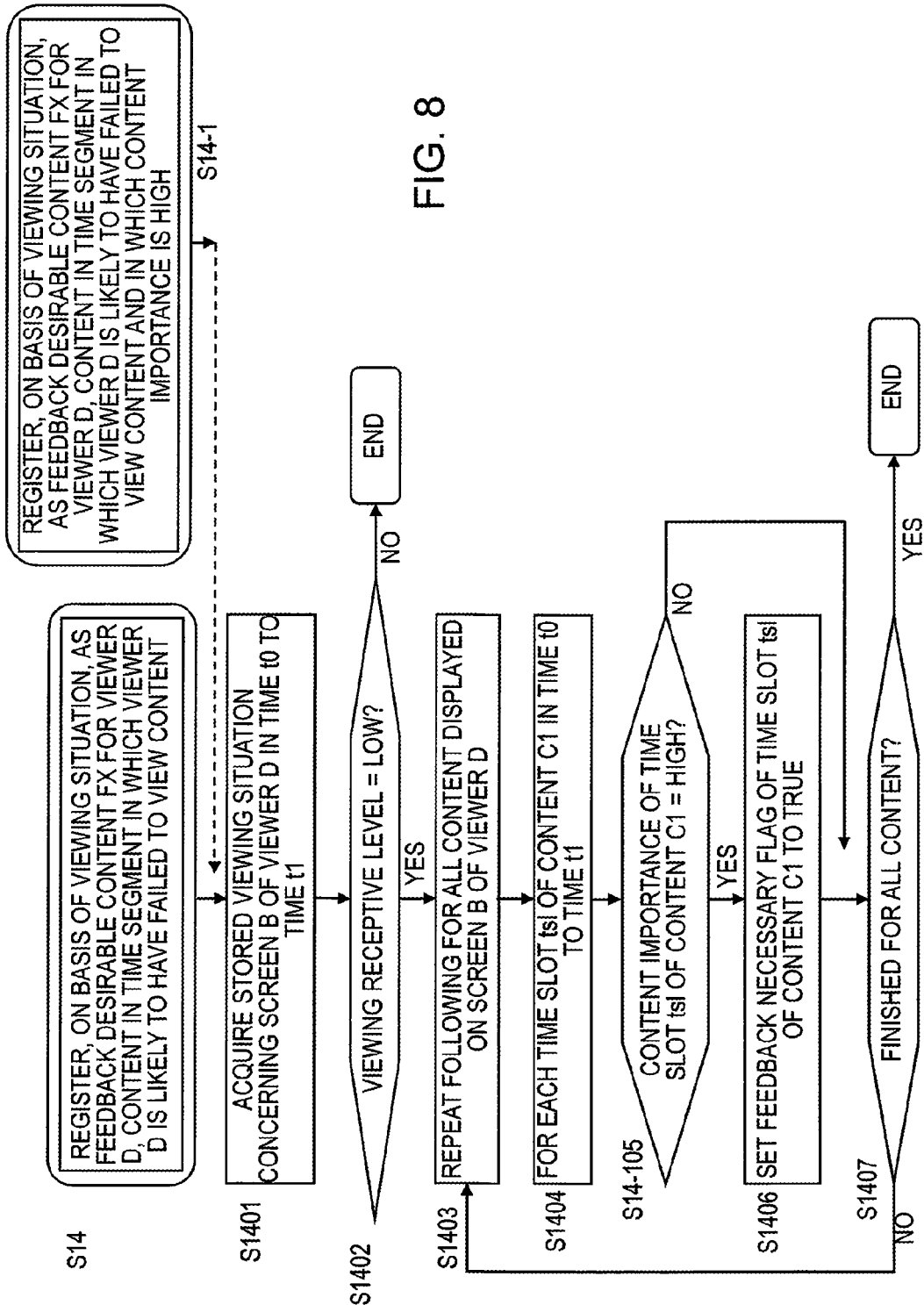
FIG. 8 is a flowchart of the feedback desirable content registering step S14-1.

FIG. 8 is a flowchart of the feedback desirable content registering step S14-1. The feedback desirable content registering step S14-1 is a registering step in the second and third content provision processing in FIGS. 3 and 4. The registering step S14 in the first content provision processing in FIG. 1 is the same as the step S14-1 except that content importance is not taken into account.

FIG. 9 is a diagram for explaining the feedback desirable content registration processing. In FIG. 9, an example of (1) (2) content importance data stored in the content evaluation processing step S3, (3) a viewing situation of the content C1 of the present user D, and (4) feedback part distinguishing data are depicted.

In the feedback desirable content registering step S14-1, the server Ts registers, on the basis of a viewing situation, as feedback desirable content FX, content in a time segment in which a viewer is likely to have failed to view the content and in which content importance is high. That is, when the viewer is in a viewing situation in which viewing is uncontrollable in meeting with a guest or receiving a telephone call and the viewer is determined as not being able to view content much, the server Ts registers, as a point to be displayed as feedback in future, content displayed in such a time frame. Processing steps S1401 to S1407 in FIG. 8 are explained below with reference to FIG. 9.

S1401

The server Ts extracts or checks a viewing situation concerning the screen B of the user D at time t0 to time t1 stored in step S12 (S1401). When it is assumed that, for example, multiple content is displayed on the screen B, a viewing situation of the content C1 among the multiple content is depicted in (3) of FIG. 9.

S1402

The server Ts determines whether a viewing receptive level of the viewing situation is the L level (S1402). In the case of L level, the server Ts determines that the user D does not set the visual attention on the screen. In this determination, the server Ts may determine whether both of a viewing receptive level and a viewing controllable level are the L level. In the case of L/L level, the server Ts determines that the user D may be unable to view content because of an inevitable accident such as leaving seat for a telephone call.

S1403

When the viewing receptive level is the L level (YES in S1402), the server Ts repeats processing explained below for all the content displayed on the screen B to the user D.

S1404, S14-105, and S1406

For each time slot tsl of the content C1 at time t0 to time t1 (S1404), if content importance of the time slot tsl of the content C1 is the H level (YES in S14-105), the server Ts sets a feedback necessary flag of the time slot tsl of the content C1 to true (S1406). The server Ts performs this processing for all time slots of content.

S1407

The server Ts executes the processing S1404, S14-105, and S1406 on all the content displayed on the screen B (S1407).

In the example depicted in FIG. 9, the evaluated content importance data of the content C1 to the users A and the like is the H level in time slot tsl=3 to 10 of the content C1. A viewing receptive level of the present viewing situation is the H level in the time slot tsl=3 to 10 of the present content C1. Therefore, in feedback part distinguishing data, the feedback necessary flag in the time slot tsl=3 to 10 is true.

FIG. 24 is a diagram depicting a registration example of feedback content. In FIG. 24, the feedback necessary flag is true in a time slot 3 to 5 of the content C1 displayed on the screen B of the user D. This matches FIG. 9.

In the first content provision processing in FIG. 2, content importance is not taken into account in the feedback desirable content registration processing S14. Therefore, in the first content provision processing, when the viewing receptive level is the L level, a time slot of content at that point is registered as feedback desirable content.

[Processing Step S23: Composite Content Creating Step]

Figure 10:
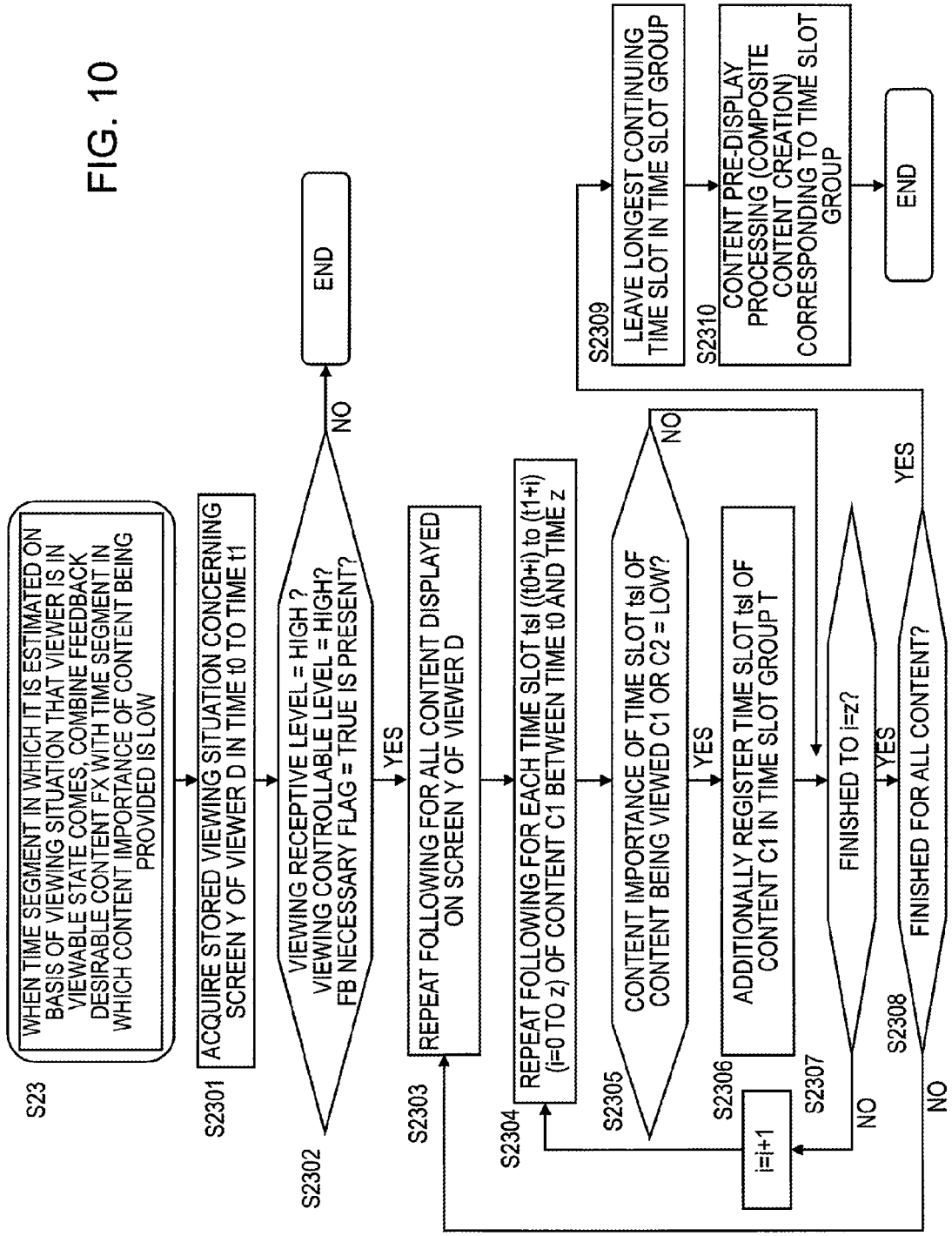
FIG. 10 is a flowchart of the composite content creating step S23.

FIG. 10 is a flowchart of the composite content creating step S23. In the composite content creating step S23, when a time segment estimated on the basis of a viewing situation as being in a viewable state comes, in a time segment in which content importance of content being provided is low, the server Ts combines the feedback desirable content FX with the content being provided. That is, when a viewer is in a viewing situation in which the viewer can be determined as concentratedly viewing content without any interference, if there are feedback desirable content, in order to provide the feedback desirable content at timing when content importance of the content currently being viewed decreases, the server Ts performs pre-display processing for the timing, combines the feedback desirable content with the content being provided, and prepares for display.

Alternatively, contrary to the above, the server Ts may combine the feedback desirable content with a content part with low importance in advance to prepare to be capable of displaying content and, after checking a viewing situation of a user, immediately perform presentation of feedback information right after it is determined that the viewing situation has no problem for feedback information reception.

FIG. 11 is a diagram for explaining a composite content creating step. In FIG. 11, (1) a viewing situation of the content C1 or C2 for the present user D, (2) content importance of the content C1 or C2 being provided of the user D, (3) a feedback candidate time slot group, and (4) composite content for the content C1 or C2 being provided of the user D are depicted. The flowchart of FIG. 10 is explained with reference to FIG. 11.

First, as a precondition, the server Ts records a viewing situation of a viewer calculated substantially on a real time basis. The server Ts acquires a recorded viewing situation concerning content currently being provided in a time segment of time t0 to time t1 (S2301) and starts processing for determining whether the viewer can receive feedback desirable content in the viewing situation and processing for determining whether feedback desirable content is present (S2302). Concerning the viewing situation, when both of a viewing receptive level and a viewing controllable level of the screen B of the user D is the H level, this means that the user D is in a good state of a viewing situation for contents on the screen B. When the viewing situation is good, if feedback desirable content is provided while being incorporated in the content displayed on the screen B of the user D, it is highly likely that the user D can also view the feedback desirable content in a good state.

Therefore, being triggered by the fact that both of the viewing receptive level and the viewing controllable level are the H level, the server Ts thereafter monitors, concerning the content currently being viewed, when is timing with low content importance and performs editing of content beforehand such that the feedback desirable content can be combined and displayed in a time slot with low content importance.

In an example explained in this embodiment, feedback is performed at nearest timing with low content importance. However, a point for performing feedback may be determined according to the H or L level of one of viewing importance and provision importance. Alternatively, the point for performing feedback may be determined using not only data allocated to content in advance such as the viewing importance and the provision importance but also dynamic data such as a situation in which it is possible to estimate at a high probability on the basis of a situation during viewing of the user D and a situation during viewing of other users that a user determines that the importance of content is low on the basis of, for example, similarity to a viewing situation and an attentive audience sensing data peculiar to time when content with low content importance is viewed.

In the determination, the feedback desirable content to be combined and embedded and the content currently being displayed do not need to be the same. The total length of time slots of the feedback desirable content to be embedded and the total length of time slots of the content currently being displayed do not need to be the same.

First, when content displayed on the screen B of the user D is two kinds of content, i.e., the content C1 and the content C2, the server Ts checks whether a time slot with low content importance is present in a time slot $(t_{0+i})$ to $(t_{1+i})$ (i=0−z) during from t0 until z seconds after time t0 in any one of the two kinds of content (S2303, S2304, and S2305). The z seconds is set to, for example, time in which a good state of a viewing situation can be expected to continue. Further, a section of the z seconds may be set after minimum time for the series of calculation or determination processing taking into account a calculation time. The z seconds is set to about 60 seconds.

When there is the time slot $(t_{0+i})$ to $(t_{1+i})$ with low content importance in z(=60) seconds from time t0 (YES in S2305), the server Ts records the time slot as a candidate of a time slot in which the feedback desirable content are combined and embedded (S2306). If the candidate is absent in the content C1, the server Ts searches for the candidate in the remaining content C2 (S2308).

When the candidate is found in the content C1 or the content C2, the server Ts specifies the position of a time slot continuing longest in the content in which the candidate is found earlier (S2309). In the example depicted in FIG. 11, the position of the continuing time slot is tsl=20 to 27 of the content C1.

As depicted in FIG. 11, according to the flowchart of FIG. 10, when both of the viewing receptive level and the viewing controllable level of the viewing situation concerning the screen B of the user D are the H level at time t0 to time t1 and a time slot in which the feedback necessary flag is true is present (YES in S2302), with that as a trigger, the server Ts checks in advance, for all the displayed content (S2303), whether the importance of the content being viewed is the L level (S2305) concerning the time slot $(t_{0+i})$ to $(t_{1+i})$ (i=0−z)

until the z time after time t0 (S2304). When the server Ts detects a time slot in which the content importance is the L level, the server Ts registers the time slot tsl in a time slot group T of feedback candidates.

The server Ts leaves, in the time slot group T, a longest continuing time slot tslc among time slots registered in the time slot group T (S2309). In the example depicted in FIG. 11, a time slot 20 to 27 is a longest continuing time slot. The server Ts performs content display pre-processing for combining the feedback desirable content with the time slot 20 to 27 of the content being provided (S2310).

Figure 25:
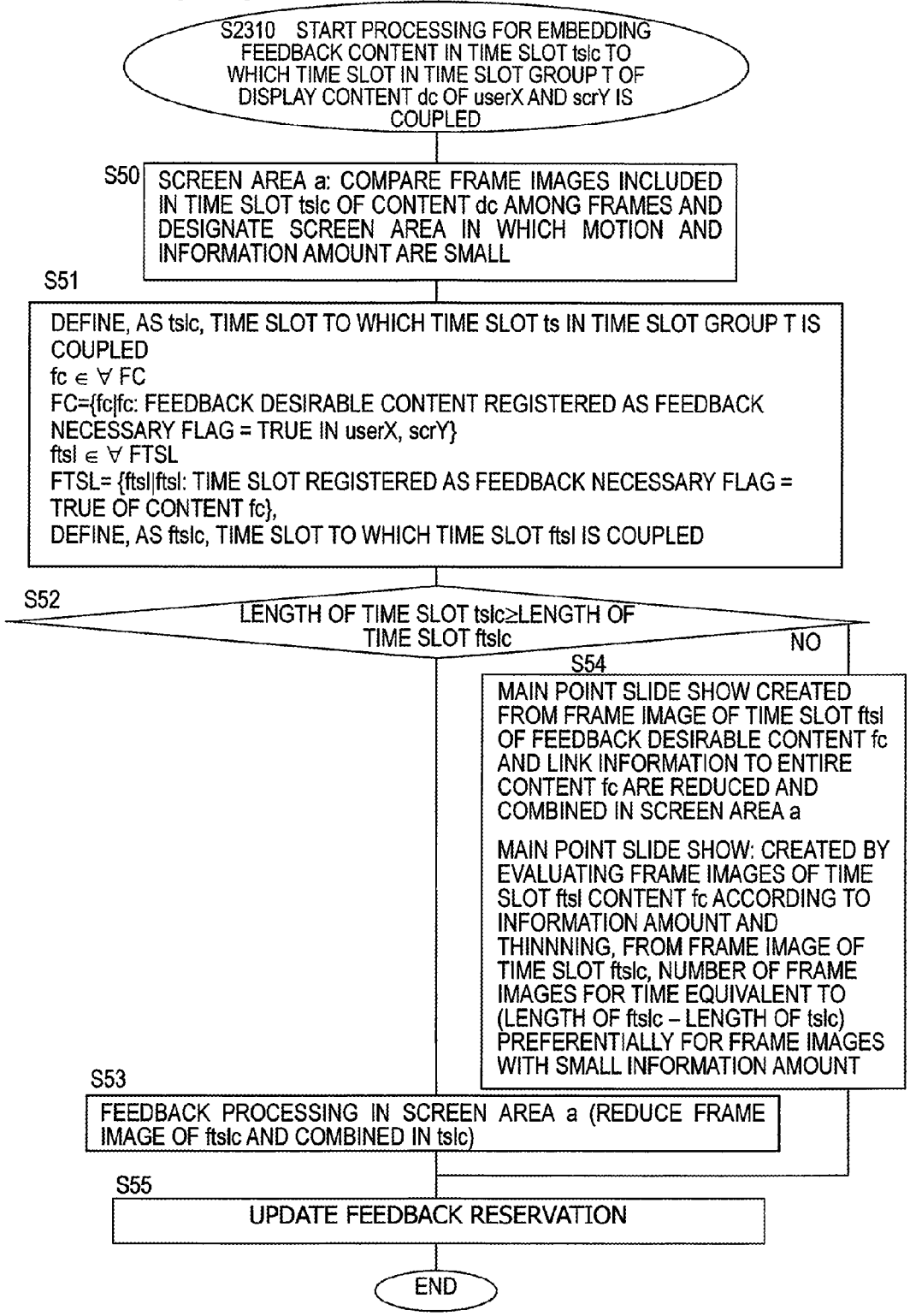
FIG. 25 is a flowchart of the content display pre-processing S2310.

FIG. 25 is a flowchart of the content display pre-processing S2310. The content display pre-processing S2310 is processing for creating composite content in FIG. 10. Processing of the flowchart is explained below.

As depicted in FIGS. 10 and 11, the server Ts performs processing (S53 and S54) for combining and embedding in advance the feedback desirable content in the detected time slot tsl=20 to 27 of the content C1 on the screen B of the user D. First, the server Ts determines a screen area "a" appropriate for embedding the feedback desirable content in the content C1, which is content being provided (S50). The screen area "a" is desirably an area in which a quantity of information of the content being provided is small. Therefore, the server Ts analyzes a frame image of content included in the time slot tsl=20 to 27 and examines and designates a screen area in which a motion and an information amount are small.

The server Ts defines, as tslc (consecutive tsl), a time slot to which the time slot tsl in the time slot group T depicted in FIG. 11 is consecutive (S51). The server Ts defines, as FC, a set of content fc (feedback desirable content fc) registered with the feedback necessary flag=true, defines, as fc, content of elements of the set FC, defines, as ftsl, a time slot registered as the feedback necessary flag=true of the content fc, and defines, as FTSL, a set of the time slot ftsl (S51). Further, the server Ts defines, as ftslc (combined of ftsl), a time slot to which the time slot ftsl is coupled (S51).

Subsequently, the server Ts determines in what kind of form the feedback desirable content is embedded (without thinning frames or by thinning frames) (S52). The feedback desirable content is long extending over a plurality of time slots in some case or are short in other cases. Different kinds of content are sometimes included in the feedback desirable content.

Therefore, concerning all content and all time slots for which the feedback necessary flag is set concerning the screen B of the user D depicted in FIG. 24, the server Ts calculates total length ftslc of a time slot for which feedback is needed. When the length tslc of the time slot in the time slot tsl=20 to 27 of the content being provided is longer than the total time segment length ftslc of the time slot of the feedback desirable content (YES in S52), the server Ts combines a reduced size version of a frame image of the time slot of the feedback desirable content in the position of the area "a" of frame images in the time slot tsl=20 to 27 of the content being provided. On the other hand, when the length tslc of the time slot in the time slot tsl=20 to 27 of the content being provided is shorter than the total time segment length ftslc of the time slot of the feedback desirable content (NO in S52), the server Ts combines only a first part of the feedback desirable content to be embedded in the time slot tslc of the content being provided. Alternatively, as in the example depicted in FIG. 25, the server Ts may create a main point slide show image from a video of all the time slots of the feedback desirable content to be fit within the time slot tsl=20 to 27 of the content being provided and combine the main point slide show image as a reduced image in the position of the area "a" in the time slot tsl=20 to 27 of the content being provided (S54).

Finally, the server Ts updates a feedback reservation (S55).

When the composite content of the feedback desirable content is created, it may be necessary to perform switching control of a screen during feedback from the content being provided to the composite content and conversely switching the composite content to the content being provided while monitoring a time slot viewed by a user. As a simple method for avoiding the switching control, the feedback desirable content may be presented in a new small window to overlap above a window of the content being provided rather than being combined.

Further, in the above explanation, as a form of the feedback desirable content, it is selected according to the length of the time slot of the content being provided whether all videos of the time slot of the feedback desirable content are presented or the main point slide show is presented. However, the priority of presentation may be determined using content importance to present only content with high priority or a form of presentation of the feedback desirable content may be determined beforehand for each of users, user groups, and content.

Concerning timing for performing feedback, in the example explained in this embodiment, within a certain fixed time, feedback is reserved in the longest coupled time slot tslc in which the content importance is the L level. However, after a viewing situation of a user is checked, if the user can receive feedback information, the feedback desirable content may be immediately presented without taking into account the importance of the content being currently viewed. It goes without saying that timing for presentation may be determined beforehand for each of users, user groups, and content.

FIG. 26 is a diagram depicting an example of feedback reservation data. In FIG. 25, content importance is low in the time slot tsl=20 to 27 of the content C1 displayed on the screen B of the user D. Content in a state in which the time slot ftsl=3 to 10 of the content C1 marked as a feedback point is embedded is already created. As shown in FIG. 26, the feedback reservation data is depicted as the user D, the screen B, the feedback desirable content C1, the time slot ftsl=3 to 10, the composite content C1 being presented, and the time slot tsl=20 to 27.

These data are temporary content. Therefore, the data are not included in the configuration diagram of the server Ts depicted in FIG. 14. As a form of stored data, a form like a content table depicted in FIG. 16 is a basic form. A column for associating the table and a table depicted in FIG. 26 only has to be present in any one of the tables.

[Processing Step S24-2: Feedback Desirable Content Provision Processing Step]

Figure 12:
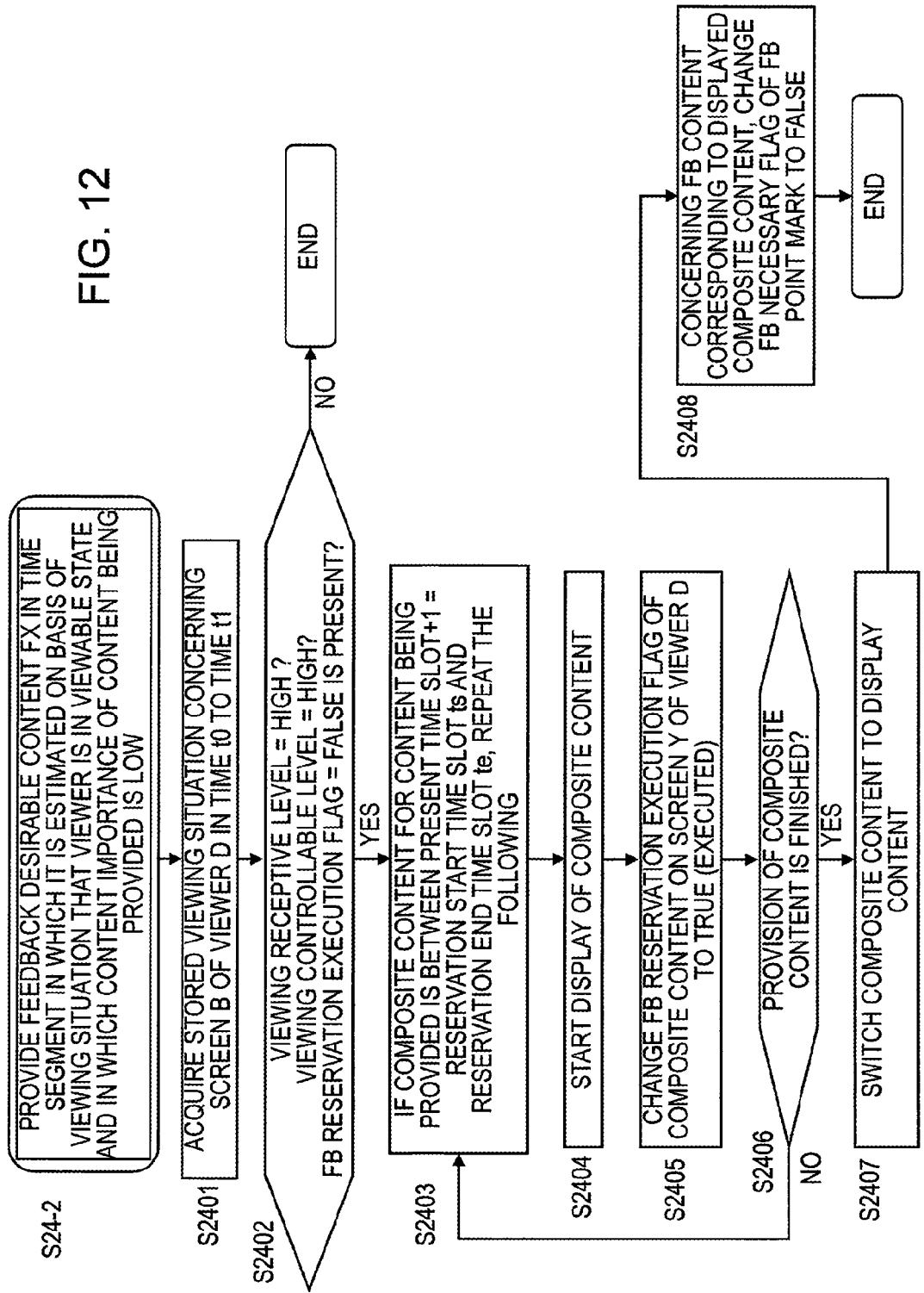
FIG. 12 is a flowchart of the feedback desirable content provision processing step S24-2.

FIG. 12 is a flowchart of the feedback desirable content provision processing step S24-2. In the feedback desirable content presentation processing step S24-2, the server Ts presents composite content embedded with the feedback desirable content in a time segment in which it is estimated on the basis of a viewing situation that a user is in a viewable state and in which content importance of content being provided is the L level.

That is, when the user is in a viewing situation in which it is possible to determine that the user is concentratedly viewing content without any interference, when there is a feedback reservation not executed yet, if the content currently being viewed enters a time segment in which feedback is reserved, the server Ts displays an image of the composite content reserved in FIG. 26.

Figure 13:
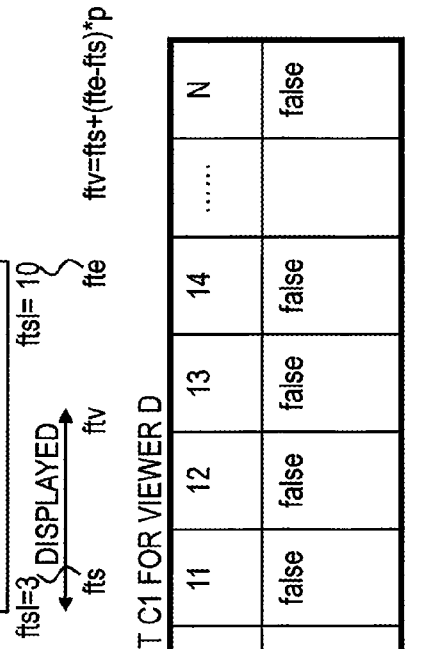
FIG. 13 is a diagram for explaining the feedback desirable content provision processing step.

FIG. 13 is a diagram for explaining the feedback desirable content provision processing step. In FIG. 13, (1) a viewing situation of the content C1 or C2 for the present viewer D, (2) a display situation of a composite content of the content C1 or C2 being provided of the viewer D, and (3) feedback part distinguishing data in which the feedback necessary flag is recorded are depicted. The flowchart of FIG. 12 is explained with reference to FIG. 13.

After calculating or estimating and recording a user viewing situation calculated or estimated substantially on a real time basis, the server Ts acquires the stored viewing situation (S2401) and starts, concerning content in a time segment of recorded time t0 to time t1, determination processing for determining whether a viewer is in a viewing situation in which the viewer can receive the feedback desirable content and determination processing for determining whether there is a feedback reservation (S2402). When both of the viewing receptive level and the viewing controllable level of the screen B of the user D are the H level, this means that the user D is in a good state of a viewing situation for content on the screen B. In such a good state of the viewing situation, the server Ts determines whether there are feedback desirable content for which a feedback reservation is made but feedback is not executed yet according to whether there are feedback desirable content in which a feedback reservation execution flag is false (S2402).

When there is data for which feedback is not executed in the good state of the viewing situation (YES in S2402), the server Ts checks, concerning a composite content corresponding to content being currently provided, whether a time slot of the content being currently provided coincides with the time slot tsl=20 to 27 of reserved content (S2403). That is, when the next time slot (tsl=present time slot+1) of the present time slot is within a time slot between a reservation start time slot tsl=20 and a reservation end time slot tsl=27 (S2403), the server Ts performs display of the composite content (S2404).

A display form of the feedback desirable content is not limited to the composite content and may be a form including a user interface for acquiring information concerning the combine content. In that case, the viewer can perform operation to display the composite content on the basis of the user interface.

Subsequently, the server Ts changes the feedback reservation execution flag of the content C1 on the screen B of the user D to true and sets the feedback reservation to an executed state (S2405). If the reserved time slot tsl=20 to 27 elapses in the content C1, the server Ts switches the content being provided to the original content (S2407).

The server Ts stores the display of the composite content as a display history as depicted in FIG. 16. In storing the display of the composite content, concerning the displayed time slot, the server Ts rewrites the feedback necessary flag in the feedback part distinguishing data in FIG. 24 to false and stores that feedback is already performed (S2408). In FIG. 13, it is depicted that (3) the feedback necessary flag of the feedback part distinguishing data is rewritten from true to false.

Figure 27:
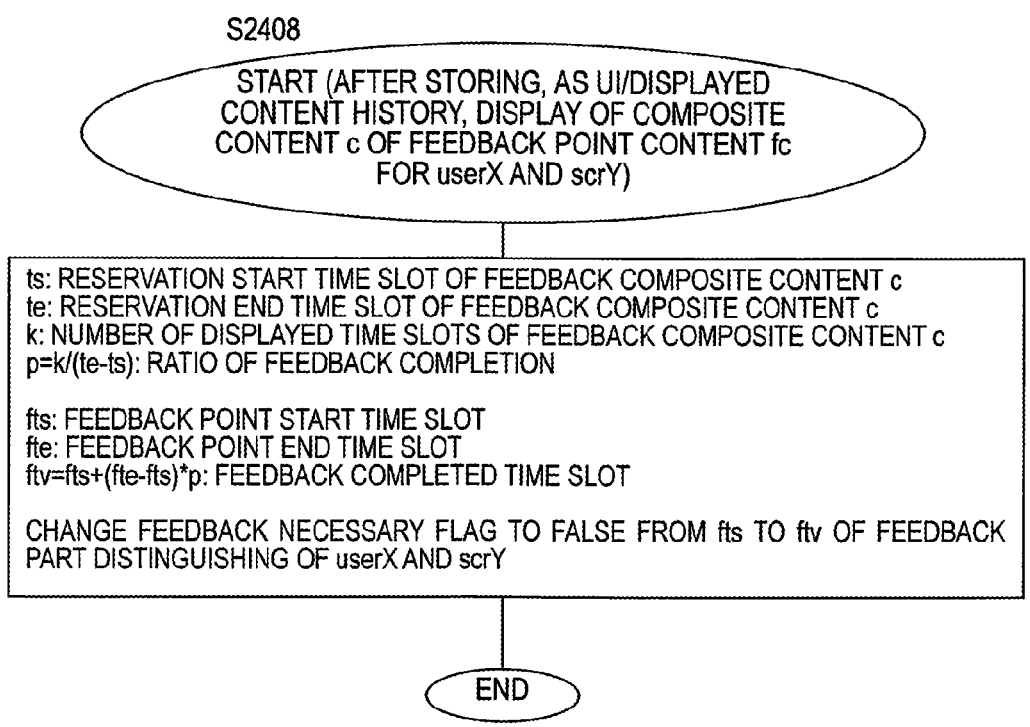
FIG. 27 is a flowchart of the processing step S2408.

FIG. 27 is a flowchart of the processing step S2408. The processing step S2408 is explained with reference to FIG. 13 as well. First, concerning a time slot of the content being provided, when a reservation start time slot of feedback composite content is represented as ts (=20), a reservation end time slot is represented as te (=27), and the number of displayed time slots is represented as k, a ratio p of feedback completion is represented as p=k/(te−ts). On the other hand, when a feedback point start time slot of the composite content is represented as fts (=3) and an end time slot is represented as fts (=10), feedback-completed final time slot ftv is represented as ftv=fts+(fte−fts)*p. That is, the feedback-completed final time slot ftv in the composite content is calculated at a ratio same as the feedback completion ratio p in the content being provided.

The server Ts changes the feedback necessary flag in the feedback part distinguishing in FIG. 24 to false, which indicates feedback completion, from the time slot fts (=3) to the time slot ftv (=any one of 3 to 10). When a feedback reservation is left without being executed for a fixed period, the server Ts may perform processing for automatically cancelling the reservation.

As explained above, according to this embodiment, even when an emotional response is less easily obtained from a viewer as in E-learning, it is possible to collect attentive audience sensing data for quantity of information contact measurement and acquire a viewing situation of the viewer. It is possible to evaluate the importance of certain content on the basis of the viewing situation of the viewer. It is possible to specify, on the basis of the viewing situation of the viewer, content that the viewer is likely to have failed to view and register the content as feedback desirable content. Further, it is possible to provide, on the basis of the viewing situation of the viewer, the feedback desirable content under a situation in which the viewer can view content.

In the embodiment, the viewing of a video of a speech or E-learning is explained on the basis of a situation in which a viewer views the video in front of a desktop screen. However, the viewing is not limited to this. What a user is viewing may be visualization of a real world rather than a delivered video.

With a head mounted display (HMD) with a camera, a real world around a user viewed by the user can be sampled by the camera. In particular, when the user acts alone, a viewing reaction of the user alone is less easily depicted. It is difficult to determine the importance of a viewing target from a facial expression, a shout of joy, and the like. Therefore, it is possible to more appropriately determine the importance of viewing target content by comprehensively evaluating viewing situations of a large number of users. In that case, the length and the order of time slots are different depending on the users. It is possible to calculate a viewing Good ratio of the time slots by performing processing such as association of similar time slots.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium storing a content providing program causing a computer to execute content provision processing comprising:
   acquiring a first viewing situation of a first viewer viewing a provided content in association with time when the content is provided;

acquiring second viewing situations of a plurality of second viewers viewing the provided content in association with the time when the content is provided;

evaluating, on the basis of the acquired second viewing situations of the plurality of second viewers, content in a time segment, in which the plurality of second viewers are likely to have viewed the content at own wills of the second viewers, to be content of high importance;

registering feedback desirable content in a time segment being overlapped by a first time segment in which the first viewer is likely to have failed to view the content on the basis of the first viewing situation of the first viewer, and a second time segment in which the plurality of second viewers are likely to have viewed the content at own wills of the second viewers on the basis of the acquired second viewing situations of the plurality of second viewers;

estimating, on the basis of the first viewing situation of the first viewer, a state in which the first viewer is enabled to view the content; and providing the first viewer with the feedback desirable content in a time segment in which estimation is made that the first viewer is in a viewable state.

2. The non-transitory computer readable storage medium storing the content providing program according to claim 1, wherein, in the provision of the feedback desirable content, the feedback desirable content is provided to the first viewer in a time segment in which estimation is made that the first viewer is in the viewable state and also in which the content importance is low.

3. The non-transitory computer readable storage medium storing the content providing program according to claim 1, wherein the content provision processing further comprises generating a composite content by combining, in the time segment where estimation is made that the first viewer is in the viewable state, the feedback desirable content with content being provided in a time segment in which the content being provided is content of low importance, and in the provision of the feedback desirable content, the composite content is provided to the first viewer in the time segment in which estimation is made that the first viewer is in the viewable state.

4. The non-transitory computer readable storage medium storing the content providing program according to claim 1, wherein the viewing situation includes a viewing receptive level indicating at what degree the viewer is enabled to view the content at own wills of the viewer and also indication a viewing controllable level indicating at what degree the viewer is enable to control the viewing situation of the viewer viewing the content, in the acquisition of the first viewing situation of the first viewer or acquisition of the second viewing situations of the second viewers, in accordance with a length of time in which an actual visual attention of the viewer stays in a content display region of a display screen during the provision of the content, the viewing receptive level is evaluated to be higher as the staying time is longer, and, in accordance to an event for increasing or reducing an amount of information contact with the content during the provision of the content, the viewing controllable level is evaluated to be higher as the amount of information contact increases, and in the evaluation of the content importance, a time segment, in which both of the viewing receptive level and the viewing controllable level are high, is evaluated as a time segment, in which the plurality of second viewers are likely to have viewed the content at own wills of the second viewers.

5. The non-transitory computer readable storage medium storing the content providing program according to claim 4, wherein, in the registration of the missed content as the feedback desirable content, a time segment in which the viewing receptive level is low is evaluated as a time when the first viewer is likely to have failed to view the content.

6. The non-transitory computer readable storage medium storing the content providing program according to claim 4, wherein, in the providing the first viewer with the feedback desirable content, the time segment, in which both of the viewing receptive level and the viewing controllable level are high, is estimated as a time segment, in which the first viewer is in a viewable state.

7. The non-transitory computer readable storage medium storing the content providing program according to claim 3, wherein, the viewing situation includes a viewing receptive level indicating at what degree the viewer is enabled to view the content at own wills of the viewer and also indication a viewing controllable level indicating at what degree the viewer is enable to control the viewing situation of the viewer viewing the content, in the acquisition of the first viewing situation of the first viewer or acquisition of the second viewing situations of the second viewers, in accordance with a length of time in which an actual visual attention of the viewer stays in a content display region of a display screen during the provision of the content, the viewing receptive level is evaluated to be higher as the staying time is longer, and, in accordance to an event for increasing or reducing an amount of information contact with the content during the provision of the content, the viewing controllable level is evaluated to be higher as the amount of information contact increases, and in the generation of composite content, the time segment, in which both of the viewing receptive level and the viewing controllable level are high, is evaluated as the time segment, in which estimation is made that the first viewer is in the viewable state.

8. A content providing method for causing a computer to execute content provision processing for providing a viewer with content, the content provision processing comprising:

acquiring a first viewing situation of a first viewer viewing a provided content in association with time when the content is provided;

acquiring second viewing situations of a plurality of second viewers viewing the provided content in association with the time when the content is provided;

evaluating, on the basis of the acquired second viewing situations of the plurality of second viewers, content in a time segment, in which the plurality of second viewers are likely to have viewed the content at own wills of the second viewers, to be content of high importance;

registering feedback desirable content in a time segment being overlapped by a first time segment in which the first viewer is likely to have failed to view the content on the basis of the first viewing situation of the first viewer, and a second time segment in which the plurality of second viewers are likely to have viewed the content at own wills of the second viewers on the basis of the acquired second viewing situations of the plurality of second viewers;

estimating, on the basis of the first viewing situation of the first viewer, a state in which the first viewer is enabled to view the content; and providing the first viewer with the feedback desirable content in a time segment in which estimation is made that the first viewer is in a viewable state.

9. A content providing apparatus that provides a viewer with content, the content providing apparatus comprising:

a first viewing situation acquiring unit configured to acquire a first viewing situation of a first viewer viewing a provided content in association with time when the content is provided;

a second viewing situation acquiring unit configured to acquire second viewing situations of a plurality of second viewers viewing the provided content in association with the time when the content is provided;

an evaluating unit configured to evaluate, on the basis of the acquired second viewing situations of the plurality of second viewers, content in a time segment, in which the plurality of second viewers are likely to have viewed the content at own wills of the second viewers, to be content of high importance;

a feedback desirable content registering unit configured to register feedback desirable content in a time segment being overlapped by a first time segment in which the first viewer is likely to have failed to view the content on the basis of the first viewing situation of the first viewer, and a second time segment in which the plurality of second viewers are likely to have viewed the content at own wills of the second viewers on the basis of the acquired second viewing situations of the plurality of second viewers a viewable state estimating unit configured to estimate, on the basis of the first viewing situation of the first viewer, a state in which the first viewer is enabled to view the content; and a feedback desirable content providing unit configured to provide the first viewer with the feedback desirable content in a time segment in which estimation is made that the first viewer is in a viewable state.

* * * * *